United States Patent
Zheng

(10) Patent No.: US 11,734,060 B2
(45) Date of Patent: Aug. 22, 2023

(54) GRAPH DATA BASED TASK SCHEDULING METHOD, APPARATUS AND STORAGE MEDIUM THEREOF

(71) Applicant: TENCENT TECHNOLOGY (SHENZHEN) COMPANY LIMITED, Shenzhen (CN)

(72) Inventor: Bo Zheng, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 466 days.

(21) Appl. No.: 17/009,342

(22) Filed: Sep. 1, 2020

(65) Prior Publication Data

US 2020/0401445 A1    Dec. 24, 2020

Related U.S. Application Data

(63) Continuation of application No. PCT/CN2019/080122, filed on Mar. 28, 2019.

(30) Foreign Application Priority Data

May 16, 2018   (CN) .......................... 201810466739.X

(51) Int. Cl.
*G06F 9/46* (2006.01)
*G06F 9/48* (2006.01)
(Continued)

(52) U.S. Cl.
CPC ............ *G06F 9/4881* (2013.01); *G06F 9/485* (2013.01); *G06F 9/5066* (2013.01);
(Continued)

(58) Field of Classification Search
CPC ...... G06F 9/4881; G06F 9/485; G06F 9/5066; G06F 9/5088; G06F 2209/5022
See application file for complete search history.

(56) References Cited

U.S. PATENT DOCUMENTS

| 8,510,538 B1 | 8/2013 | Malewicz et al. |
| 8,972,378 B2 | 3/2015 | Halverson et al. |

(Continued)

FOREIGN PATENT DOCUMENTS

| CN | 103631657 | 3/2014 |
| CN | 105446979 | 3/2016 |

(Continued)

OTHER PUBLICATIONS

Office Action issued in Japanese application 2020-564236 dated Dec. 3, 2022, 3 pages.

(Continued)

*Primary Examiner* — Diem K Cao
(74) *Attorney, Agent, or Firm* — Crowell & Moring, L.L.P.

(57) ABSTRACT

This disclosure relates to a graph-data-based task scheduling method, which includes: obtaining subgraph data divided from graph data to be processed by a computing node, performing a unit computing task for a graph node in the subgraph data, obtaining a first quantized value corresponding to a completed unit computing task in response to data corresponding to the completed unit computing task being formed into blockchain data, obtaining a second quantized value corresponding to the completed unit computing task in response to the data corresponding to the completed unit computing task being not formed into blockchain data, determining a third quantized value corresponding to an uncompleted unit computing task in the subgraph data, and exchanging the graph node and the first quantized value with another computing node in response to the second quantized value and the third quantized value failing to meet an equilibrium condition.

20 Claims, 7 Drawing Sheets

(51) Int. Cl.
*G06F 16/23* (2019.01)
*G06F 16/901* (2019.01)
*G06F 9/50* (2006.01)

(52) U.S. Cl.
CPC ........ *G06F 9/5088* (2013.01); *G06F 16/2379* (2019.01); *G06F 16/9024* (2019.01); *G06F 2209/5022* (2013.01)

(56) References Cited

U.S. PATENT DOCUMENTS

| | | |
|---|---|---|
| 2015/0227586 A1 | 8/2015 | Li et al. |
| 2017/0039330 A1 | 2/2017 | Tanner, Jr. et al. |
| 2017/0109207 A1 | 4/2017 | Li et al. |
| 2017/0364701 A1 | 12/2017 | Struttmann |

FOREIGN PATENT DOCUMENTS

| | | | | |
|---|---|---|---|---|
| CN | 105590321 | | 5/2016 | |
| CN | 106033476 | | 10/2016 | |
| CN | 106777351 | | 5/2017 | |
| CN | 108681482 | | 10/2018 | |
| CN | 108683738 B | * | 8/2020 | ........... G06F 9/4881 |
| CN | 108681482 B | * | 12/2020 | ......... G06F 16/2379 |
| JP | 7061693 B2 | * | 4/2022 | ......... G06F 16/2379 |
| JP | 7158801 B2 | * | 10/2022 | ........... G06F 9/4881 |
| KR | 102485652 B1 | * | 1/2023 | ........... G06F 9/4881 |
| WO | WO 2014/102996 A1 | | 7/2014 | |

OTHER PUBLICATIONS

Translation of Japanese office action 2020-564236, 5 pages.
Extended European Search report issued on European application 19803567.7 dated May 19, 2021, 12 pages.
International Search Report issued in International Application No. PCT/CN2019/080122 dated Jun. 13, 2019, English translation.
Journal of East China Normal University (Natural Science), No. 5, Sep. 2014, pp. 55-71.
Systems Engineering—Theory & Practice, vol. 30, No. 11, Nov. 2010, pp. 10-30.

* cited by examiner

GRAPH DATA BASED TASK SCHEDULING METHOD, APPARATUS AND STORAGE MEDIUM THEREOF

RELATED APPLICATION

This application is a continuation application of PCT Patent Application No. PCT/CN2019/080122, filed on Mar. 28, 2019, which claims priority to Chinese Patent Application No. 201810466739.X, filed on May 16, 2018 and entitled "GRAPH DATA-BASED TASK SCHEDULING METHOD AND APPARATUS", wherein the entirety of each of the above-referenced applications is incorporated herein by reference in its entirety.

FIELD OF THE TECHNOLOGY

This disclosure relates to the field of graph computing technologies, and in particular, to a graph data based task scheduling method and apparatus, a storage medium, and a device.

BACKGROUND OF THE DISCLOSURE

With development of computer technologies, there is an abstract expression of the real world by using a graph structure based on a "graph theory", and a computing mode based on this data structure, that is, graph computing. In an application, graph data may be used for representing information such as a social network, a commodity purchase relationship, a road traffic network, a communications network, and there are a demand for increasingly complex computing requirements based on the graph data.

SUMMARY

According to an aspect of the disclosure, a graph-data-based task scheduling method is provided. The method may include obtaining subgraph data divided from graph data to be processed by a computing node; performing a unit computing task for a graph node in the subgraph data; and obtaining a first quantized value. The first quantized value is a quantized value corresponding to a completed unit computing task in response to data corresponding to the completed unit computing task being formed into blockchain data. The method may further include obtaining a second quantized value, which is a quantized value corresponding to the completed unit computing task in response to the data corresponding to the completed unit computing task being not formed into blockchain data. The method may further include determining a third quantized value corresponding to an uncompleted unit computing task in the subgraph data; and exchanging the graph node and the first quantized value with another computing node in response to the second quantized value and the third quantized value failing to meet an equilibrium condition.

According to an aspect of the disclosure, a graph-data-based task scheduling apparatus is provided. The apparatus may include a memory operable to store program code and a processor operable to read the program code. The processor is configured to obtain subgraph data divided from graph data to be processed by a computing node; perform a unit computing task for a graph node in the subgraph data; obtain a first quantized value which is a quantized value corresponding to a completed unit computing task in response to data corresponding to the completed unit computing task being formed into blockchain data; obtain a second quantized value which is a quantized value corresponding to the completed unit computing task in response to the data corresponding to the completed unit computing task being not formed into blockchain data; determine a third quantized value corresponding to an uncompleted unit computing task in the subgraph data; and exchange the graph node and the first quantized value with another computing node in response to the second quantized value and the third quantized value failing to meet an equilibrium condition.

According to an aspect of the disclosure, a non-transitory machine-readable media is provided. The non-transitory machine-readable media may have processor executable instructions stored thereon for causing a processor to obtain subgraph data divided from graph data to be processed by a computing node; perform a unit computing task for a graph node in the subgraph data; obtain a first quantized value which is a quantized value corresponding to a completed unit computing task in response to data corresponding to the completed unit computing task being formed into blockchain data; obtain a second quantized value which is a quantized value corresponding to the completed unit computing task in response to the data corresponding to the completed unit computing task being not formed into blockchain data; determine a third quantized value corresponding to an uncompleted unit computing task in the subgraph data; and exchange the graph node and the first quantized value with another computing node in response to the second quantized value and the third quantized value failing to meet an equilibrium condition.

According to an aspect of the disclosure, a computer device is provided, including a memory and a processor, the memory storing a computer program, the computer program, when executed by the processor, causing the processor to perform the graph-data-based task scheduling method.

Details of one or more embodiments of this disclosure are provided in the following accompany drawings and descriptions. Other features, objectives, and advantages of this disclosure become apparent from the specification, the accompanying drawings, and the claims.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from the accompanying drawings without creative efforts.

DESCRIPTION OF EMBODIMENTS

Graph-data-based computing usually relies on a distributed computing architecture, and a graph-data-based task scheduling method may be a centralized scheduling method. For example, for a MapReduce (map reduction programming model) cluster scheduling algorithm based on a scheduling queue and a scheduling resource pool, a parameter server is usually used for scheduling and controlling computing tasks in a unified manner.

However, when the parameter server is used for scheduling and controlling computing tasks in a unified, efficiency of computing task processing depends on settings and performance of the parameter server. Once a data volume is too large, or fault tolerance of the parameter server cannot be guaranteed, processing efficiency of graph data cannot be guaranteed, and in all ongoing computing tasks, errors are reported. Especially, when dealing with computing tasks with very large data volumes, there is a problem of low efficiency of computing task scheduling in a centralized task scheduling method.

To make the objectives, technical solutions, and advantages of this disclosure clearer, the following further describes the implementations of this disclosure in detail with reference to the accompanying drawings.

Figure 1:
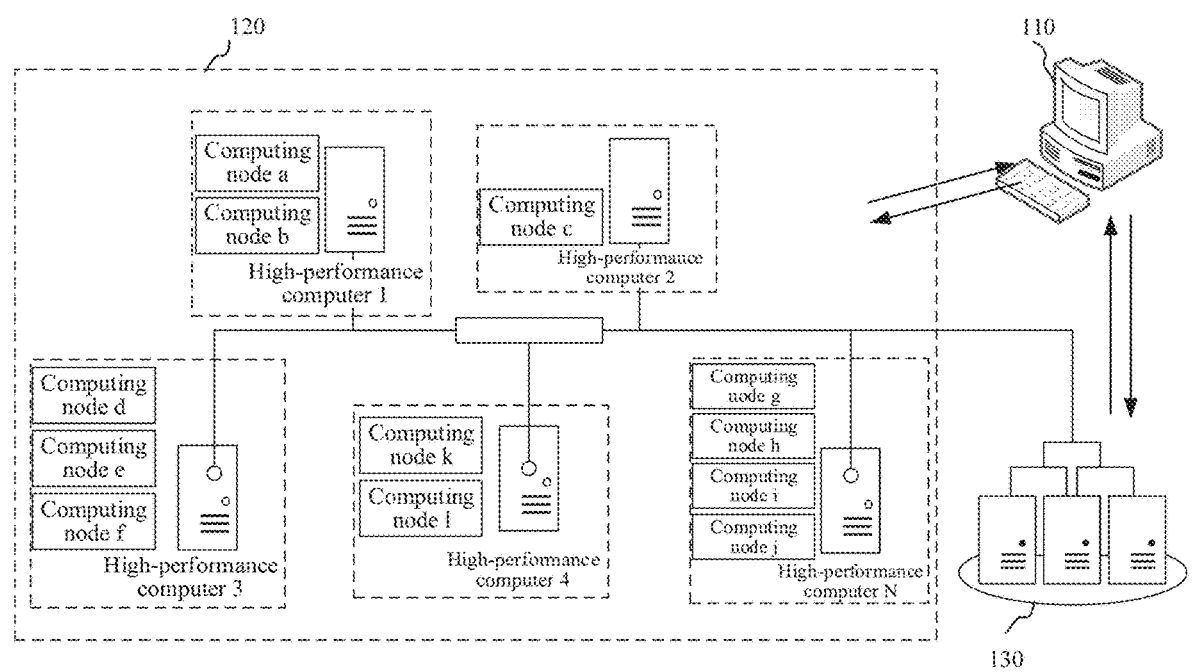
FIG. 1 is a diagram of an application environment of a graph-data-based task scheduling method in an embodiment.

FIG. 1 is a diagram of an application environment of a graph-data-based task scheduling method in an embodiment. Referring to FIG. 1, the graph-data-based task scheduling method is applied to a distributed graph computing system. The distributed graph computing system includes a control node 110, a computing node 120, and a data warehouse 130. The control node 110 is connected to the computing node 120 through a blockchain network, and the control node 110 and the computing node 120 are separately connected to the data warehouse 130 through a network. The control node 110 may be implemented by using a terminal, the terminal may be a desktop terminal or a mobile terminal, and the mobile terminal may be, for example, a mobile phone, a tablet computer, or a notebook computer. The control node 110 may be understood as a terminal configured to observe and modify an execution status, rather than a scheduling core. The computing node 120 may be implemented by using a program deployed on one or more servers. For example, computing nodes a, b, c, and the like shown in FIG. 1 are distributed on a high-performance computer 1 to a high-performance computer N respectively. Different high-performance computers distributed in the same network occupy different quantities of computing nodes due to different performance. All control nodes 110 and computing nodes 120 may directly access the data warehouse 130, for example, read an executable file and an input of an algorithm of a computing task, and store a computing result to a specified position. The data warehouse 130 may be a centralized storage device, or may be a distributed storage cluster or device. In an embodiment, the distributed graph computing system includes a plurality of computing nodes, and the graph-data-based task scheduling method may be applied to any computing node.

Figure 2:
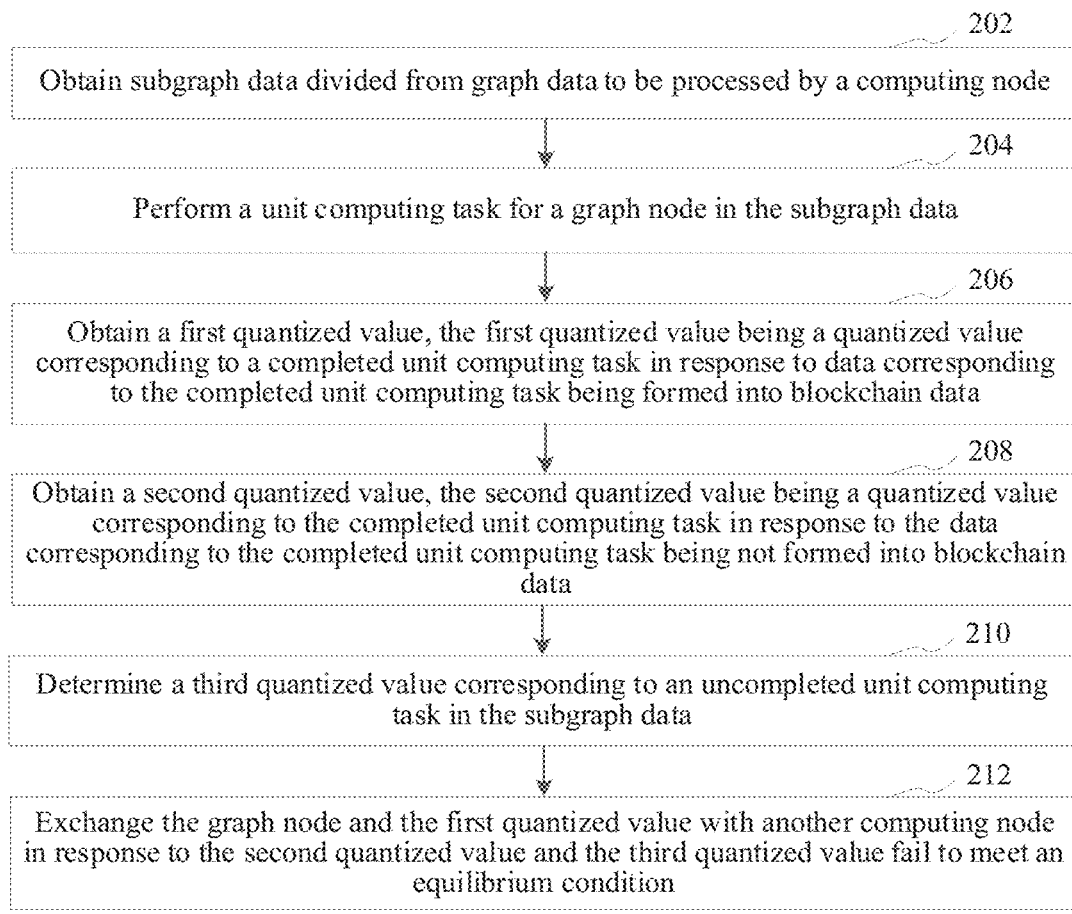
FIG. 2 is a schematic flowchart of a graph-data-based task scheduling method in an embodiment.

As shown in FIG. 2, in an embodiment, a graph-data-based task scheduling method is provided. In this embodiment, description is made mainly by using an example in which the method is applied to computing node 120 in FIG. 1. Referring to FIG. 2, the graph-data-based task scheduling method includes the following steps.

Step 202. Obtain subgraph data divided from to-be-processed graph data.

The graph data is structured data organized by using a graph structure and relationship information between entities stored by applying a graph theory. Generally, the graph data is formed by a graph node and an edge between graph nodes. The graph node is a vertex in the graph data and may be used for representing a subject in the graph data. For example, when the graph data is used for storing information between individuals in a social network, different graph nodes in the graph data may be used for representing different individuals. Alternatively, when the graph data is used for representing a commodity purchasing relationship, each user and each commodity are graph nodes. The graph node may include information such as a node identifier and a node attribute of the graph node. The edge between graph nodes is an edge in the graph data and may be used for representing a relationship between different subjects in the graph data. For example, when the graph data is used for storing information between individuals in a social network, and different graph nodes in the graph data are used for representing different individuals, the edge in the graph data may be used for representing a relationship between the individuals, for example, a friend relationship. When the graph data is used for representing a commodity purchasing relationship, and each user and each commodity are graph nodes, the user purchasing the commodity is represented by an edge or the like.

Mathematically, the graph structure may be represented by $G=<V,E>$, where $V=\{v_i\}_{i=1}^{N}$ represents a set of N graph nodes in the graph data, and $E=\{e_{ij}\}=\{(v_i,v_j)_m\}_{m=1}^{M}$ represents a connection edge between the graph nodes.

The to-be-processed graph data is graph data to be processed by the computing node.

Figure 3:
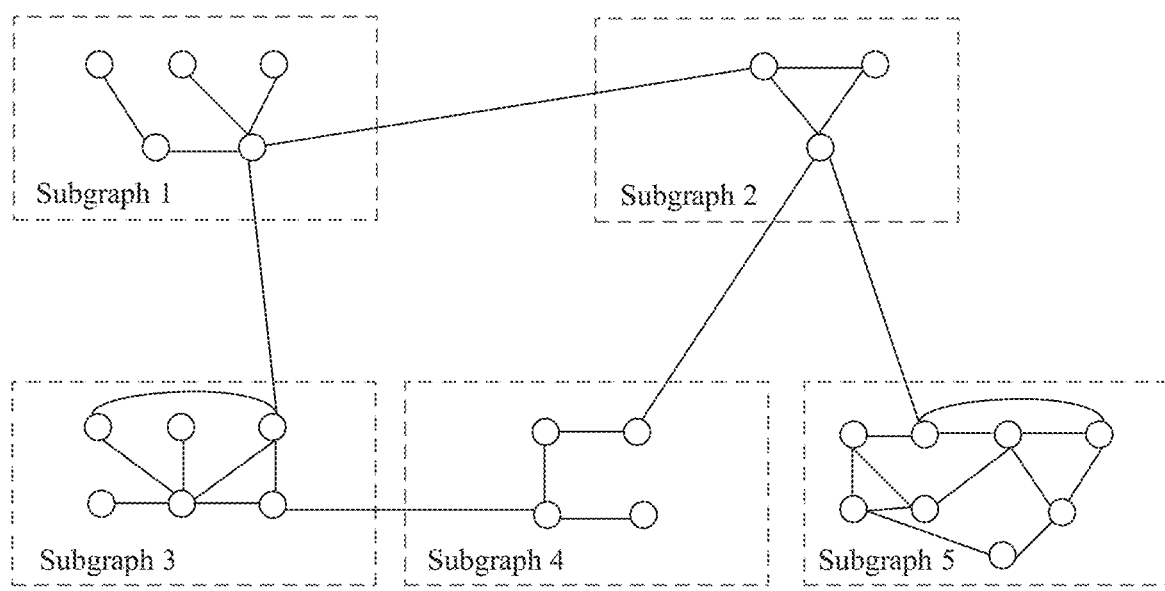
FIG. 3 is a schematic diagram of subgraph data in an embodiment.
Figure 4:
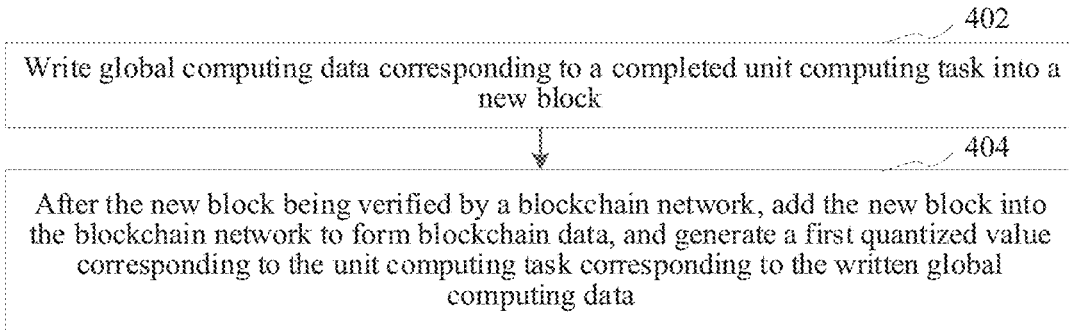
FIG. 4 is a schematic flowchart of a step of obtaining a first quantized value corresponding to a completed unit computing task that forms corresponding blockchain data in an embodiment.
Figure 5:
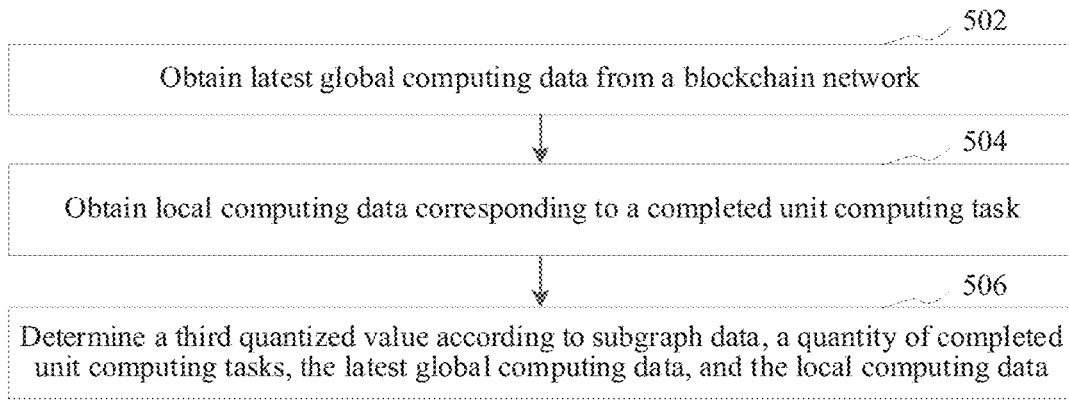
FIG. 5 is a schematic flowchart of a step of determining a third quantized value corresponding to an uncompleted unit computing task in subgraph data in an embodiment.
Figure 6:
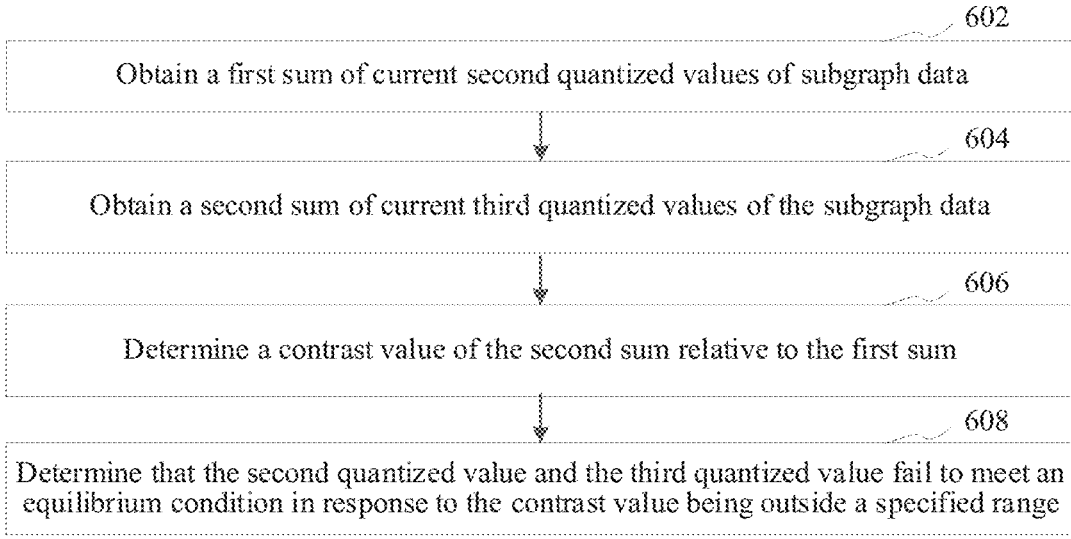
FIG. 6 is a schematic flowchart of a step of determining whether a second quantized value and a third quantized value meet an equilibrium condition in an embodiment.
Figure 7:
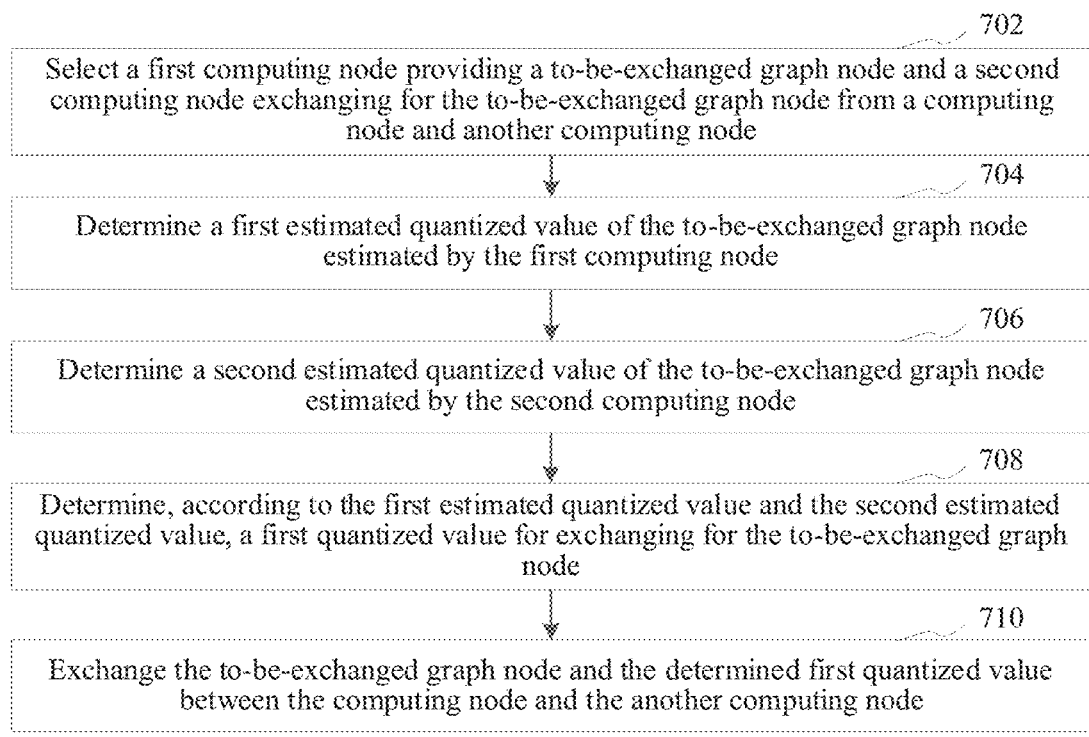
FIG. 7 is a schematic flowchart of a step of exchanging a graph node and a first quantized value between computing nodes in an embodiment.

The subgraph data is partial graph data divided from the to-be-processed graph data. Optionally, a large graph may be divided into a specific quantity of subgraphs, to make edges inside the subgraph as dense as possible and edges between the subgraphs as sparse as possible. FIG. 3 shows a schematic diagram of dividing a graph into five subgraphs.

In an embodiment, when a size of a graph is relatively small, the graph may be divided through an N-cut algorithm into subgraphs. When a size of a graph is relatively large, the graph may be divided through an approximation algorithm into subgraphs. In addition, during division of the subgraphs, in addition to the division requirements, load balance also needs to be considered. Therefore, an additional condition further needs to be added, that is, a size of the subgraph formed through division matches a capability of the computing node.

In an embodiment, each computing node may be a program deployed on one or more servers, and the computing node may form a virtual network structure through a medium, namely, a blockchain. The computing node may write information such as data, a task execution log, or a computing node status into a new block and add the new block into a blockchain network, to conveniently perform communication coordination between computing nodes and complete a computing task corresponding to the subgraph data, thereby completing a computing task corresponding to the to-be-processed graph data. The blockchain network is a carrier and an organization mode for running a blockchain technology and is a decentralized distributed database formed by external communication modules of computing nodes.

In an embodiment, the distributed graph computing system includes a control node, and the control node may communicate with one or more computing nodes in the distributed graph computing system to access the blockchain network. The control node may record task information corresponding to graph data into a new block, and add the new block into the blockchain network, to broadcast the task information in the blockchain network. In this way, all computing nodes in the blockchain network may receive the broadcast task information. The task information is information related to a computing task.

In an embodiment, the computing node may regularly check, by using a timer, a timing program, or the like, task information recorded in a new block recently added into the blockchain network. After detecting that the new block includes task information, the computing node determines its own load status. When the load status indicates that the computing node is not overload, the computing node may load the task information from the blockchain network.

In an embodiment, the task information may include an obtaining path of a task-executable file, an algorithm parameter for performing a computing task, an obtaining path of subgraph data, an output path of a computing result, an expected completion time, and the like. After loading the task information from the blockchain network, the computing node may obtain a subgraph structure in a graph structure corresponding to graph data and obtain corresponding subgraph data from a data warehouse according to the obtained subgraph structure.

In an embodiment, after loading the task information from the blockchain network, the computing node may randomly obtain a specific quantity of graph nodes and corresponding edges from the graph structure corresponding to the graph data according to its own load status to form a subgraph structure. The computing node further obtains subgraph data corresponding to the subgraph structure from the data warehouse according to the obtaining path of the subgraph data recorded in the task information.

In an embodiment, the distributed graph computing system may divide graph data into a corresponding quantity of pieces of subgraph data according to a preset condition based on a quantity of current computing nodes. The preset condition may be average division, random division, or the like, and is not limited in this embodiment.

Step 204. Perform a unit computing task for a graph node in the subgraph data.

The unit computing task is a minimum computing allocation unit in the distributed graph computing system, for example, a computing task corresponding to a specific graph node in a current iterative computing process. In this embodiment, after obtaining the subgraph data divided from the graph data, the computing node may perform corresponding computing on a graph node in the obtained subgraph data.

In an embodiment, after loading the task information, the computing node pulls, according to information, such as the obtaining path of the task-executable file and the algorithm parameter for performing the computing task, recorded in the task information, the task-executable file and the algorithm parameter for performing the computing task from the data warehouse. Further, after obtaining the subgraph data, the computing node performs the pulled task-executable file according to the algorithm parameter for performing the computing task to perform the unit computing task for the graph node in the subgraph data.

In an embodiment, computing performed on the graph data is iterative computing. As the algorithm is updated iteratively, a new computing task is generated during each iteration. Each graph node in the subgraph data may be driven by the algorithm to continuously generate to-be-completed unit computing tasks.

Step 206. Obtain a first quantized value, the first quantized value being a quantized value corresponding to a completed unit computing task in a case that data corresponding to the completed unit computing task is formed into blockchain data.

The blockchain data is data recorded in the new block added to the blockchain network, and the new block in the blockchain network may share recorded information in a broadcast manner. The quantized value is a value obtained by quantizing the unit computing task. For example, a unit computing task corresponds to a unit quantized value. The first quantized value is a value obtained by quantizing a completed unit computing task in a computing node in a case that data corresponding to the completed unit computing task is formed into blockchain data. The first quantized value may measure a computing capacity of the computing node and correspond to some completed unit computing tasks. The first quantized value may be a resource for circulated and exchanged in the blockchain network and may be referred to as a currency value, a virtual currency value, or the like.

In this embodiment, after performing the unit computing task for the graph node in the subgraph data, the computing node may record data corresponding to some completed unit computing tasks into the blockchain network to form blockchain data, and a quantized value corresponding to the completed unit computing tasks is the first quantized value.

In an embodiment, after performing the unit computing task for the graph node in the subgraph data, the computing node completes a corresponding unit computing task. After completing the corresponding unit computing task, the computing node may obtain global computing data and local computing data for calculating the subgraph data. The global computing data is data that needs to be shared and updated globally in a process of calculating the subgraph data by each computing node, and a scale of the global computing data is limited. The local computing data is data that is used and updated by only a few computing nodes in a process in which each computing node performs computing on the subgraph data.

In an embodiment, the computing node may record the global computing data in a new block, and add the new block to the blockchain network after the new block is verified by the blockchain network. In this case, the global computing data forms the blockchain data. In an embodiment, the computing node may alternatively record all related data from a previous block to a current time, for example, current global computing data, a task execution log, or a computing node status, in a new block, add the new block to the blockchain network, and obtain a corresponding first quantized value.

In an embodiment, the related data recorded in the new block may be actively broadcast, so that all computing nodes in the distributed graph computing system share the recorded related data, for example, the global computing data recorded in the new block. Alternatively, the related data recorded in the new block may be spread in a form of a request. The spreading in the form of a request means that the computing node may obtain the related data recorded in the new block by sending a request.

In an exemplary application scenario, in a graph computing problem related to graph data, a graph structure corresponding to the graph data is usually a relatively sparse graph, and consequently, a quantity M of edges in the graph data is much less than a pairwise combination of quantities N of graph nodes: $M \ll A_n^2$. In this way, the scale of the global computing data that needs to be shared globally is usually limited, and most of data has specific locality and is used by only a few computing nodes for computing, that is, most of the data is local computing data. By using the distributed graph computing system, the global computing data is shared globally through a blockchain network, the local computing data is buffered to a corresponding computing node, and the local computing data is obtained in the form of a request, thereby avoiding unnecessary network communication overheads caused by broadcasting a large volume of local computing data.

Step 208. Obtain a second quantized value, the second quantized value being a quantized value corresponding to the completed unit computing task in a case that the data corresponding to the completed unit computing task is not formed into blockchain data.

The second quantized value is a value obtained by quantizing a completed unit computing task in a computing node in a case that data corresponding to the completed unit computing task is not formed into blockchain data. The second quantized value may measure a computing capacity of the computing node and correspond to other completed unit computing tasks in the computing node. The second quantized value may be a resource that is currently owned by the computing node and may be redeemed to the first quantized value and may be referred to as an asset value. After the computing node records data corresponding to a completed unit computing task in a blockchain network to form blockchain data, an asset value corresponding to the part of the blockchain data may be converted into the same amount of currency value circulated in the blockchain network.

In this embodiment, after performing the unit computing task for the graph node in the subgraph data, the computing node obtains data. The computing node determines, according to data that is not recorded in the blockchain network, a completed unit computing task corresponding to the data. The computing node quantizes the determined completed unit computing task to obtain the second quantized value. In an embodiment, after performing the unit computing task for the graph node in the subgraph data, the computing node completes a corresponding unit computing task. After completing the corresponding unit computing task, the computing node may obtain the second quantized value corresponding to the completed unit computing task.

In an embodiment, before writing global computing data into a new block, the computing node obtains a historical second quantized value corresponding to the completed unit computing task. The historical second quantized value corresponds to a completed unit computing task that does not form into blockchain data before the global computing data is written into the new block. After the computing node writes the global computing data into the new block, and the new block is verified by the blockchain network, the first quantized value corresponding to generating the unit computing task corresponding to the written global computing data is subtracted from the historical second quantized value to obtain a current second quantized value.

In this way, by writing the global computing data into the new block to form blockchain data, a corresponding historical second quantized value may be converted into the second quantized value. Through accounting, a second quantized value that may be redeemed in the future is quickly and conveniently converted into a corresponding first quantized value that may be circulated. In this way, a sum of the first quantized value and the current second quantized value may indicate a current computing capacity of the computing node.

Step 210. Determine a third quantized value corresponding to an uncompleted unit computing task in the subgraph data.

The third quantized value is value obtained by quantizing an uncompleted unit computing task in the computing node. The third quantized value may be a value corresponding to a unit computing task to be performed by a computing node, may be referred to as a liability value, and may measure a load status of the computing node. After performing and completing an uncompleted unit computing task, the computing node may convert a third quantized value corresponding to the uncompleted unit computing task into the same amount of second quantized value, and then convert the same amount of second quantized value into the same amount of first quantized value.

In this embodiment, the computing node may obtain a current uncompleted unit computing task in real time, and determine the third quantized value according to the uncompleted unit computing task. In an embodiment, the first quantized value, the second quantized value, and the third quantized value have the same unit and all correspond to the unit computing task.

In an embodiment, a total task corresponding to graph data is fixed, and a subtask generated from subgraph data in each computing node is also fixed. The computing node completes unit computing tasks continuously by performing the unit computing tasks for the graph nodes in the subgraph data. The computing node may obtain a current uncompleted unit computing task according to the subtask generated from the subgraph data and the current completed unit computing task, to determine a corresponding third quantized value.

In an embodiment, a total task corresponding to graph data keeps changing, and a subtask generated from subgraph data in each computing node also keeps changing. The computing node may iteratively generate a computing task according to the subgraph data. As the algorithm is updated iteratively, a new computing task is generated during each iteration. Each graph node in the subgraph data may continuously generate, through algorithm driven, unit calculation tasks that need to be completed.

In an embodiment, the computing node may determine a third quantized value corresponding to an uncompleted unit computing task in subgraph data according to the subgraph data, a quantity of completed unit computing tasks, content of the completed unit computing task, global computing data shared in a blockchain network, and local computing data.

Step 212. Exchange the graph node and the first quantized value with another computing node in a case that the second quantized value and the third quantized value do not meet an equilibrium condition.

The equilibrium condition is a condition that is preset and that is used for measuring whether a current computing capacity and a current load status of the computing node are balanced. In an embodiment, that the second quantized value and the third quantized value meet an equilibrium condition means that contrast value between a second sum of the third quantized values and a first sum of the second quantized values falls within a specified range. The contrast value is a difference value between two values and may be determined through a mathematical calculation. The mathematical calculation may be direct division of two numbers, division following logarithm-taking, subtraction, division following logarithm-taking following another operation, or the like. The contrast value may measure a difference status of one value relative to another value.

In this embodiment, when the second quantized value and the third quantized value do not meet the equilibrium condition, the graph node and the first quantized value may be exchanged between computing nodes, to keep that the second quantized value and the third quantized value meet the equilibrium condition.

In an embodiment, the specified range corresponding to the equilibrium condition may be a preset fixed range, or may be a range determined by a function that varies with a time.

In the graph-data-based task scheduling method, to-be-processed graph data is divided into a plurality of pieces of subgraph data, and then, distributed processing is performed on the plurality of pieces of subgraph data, thereby greatly improving graph data processing efficiency. A first quantized value, a second quantized value, and a third quantized value are obtained separately, and when the second quantized value and the third quantized value do not meet an equilibrium condition, a graph node and the first quantized value are exchanged between a computing node and another computing node. The first quantized value and the second quantized value may measure a computing capacity of a computing node, and the third quantized value may measure a load status of the computing node. In this way, the computing capacity and the load status of the computing node may be quantitatively indicated by using quantized values corresponding to a unit computing task, which is accurate and intuitive. The graph nodes and the first quantized values are exchanged between the computing node and the another computing node, to keep that the second quantized value and the third quantized value meet the equilibrium condition. In this way, instead of relying on a specific server or node for task allocation, computing nodes cooperate with each other to allocate graph nodes, and dynamically adjust the allocation, to implement self-organized load balancing and avoid problems of single point of failure and network congestion of the specific server, thereby greatly improving task scheduling efficiency. Moreover, such a self-organized dynamic task scheduling method can adapt to computing task scheduling of a larger-scale cluster, and a dynamic increase or decrease of a quantity of computing nodes does not affect existing computing tasks, so that high scalability is achieved.

In an embodiment, step 202 may include: obtaining task information corresponding to graph data and broadcast in a blockchain network, and reading, according to the task information, a task-executable file and the subgraph data divided from the graph data. Step 204 may include: performing the task-executable file according to the subgraph data, the task-executable file being used for indicating the unit computing task for the graph node in the subgraph data.

In this embodiment, the computing node may obtain the task information corresponding to the graph data and broadcast in the blockchain network, and read, according to the task information, the task-executable file and the subgraph data divided from the graph data from the local or a data warehouse. The task-executable file is performed according to the subgraph data, to perform the unit computing task for the graph node in the subgraph data.

In an embodiment, the distributed graph computing system includes a control node, the control node may record task information corresponding to graph data into a new block and add the new block to a blockchain network to broadcast the task information in the blockchain network.

In an embodiment, all computing nodes in the blockchain network may receive the task information corresponding to the graph data through broadcast of the new block.

In an embodiment, the computing node may regularly check, by using a timer, a timing program, or the like, task information recorded in a new block recently added into the blockchain network, to actively obtain task information corresponding to graph data and broadcast in the blockchain network.

In the foregoing embodiment, the task information corresponding to the graph data and broadcast in the blockchain network is obtained, the task-executable file and the subgraph data are read according to the task information, the task-executable file is performed according to the subgraph data, and the unit computing task may be performed. The task information may be a very light (that is, a small volume of data) file. In this way, publishing a task through the blockchain network can greatly reduce communication traffic of publishing and obtaining the task in the distributed graph computing system, thereby greatly improving efficiency of the task publishing.

In an embodiment, step 206 may include the following steps.

Step 402. Write global computing data corresponding to a completed unit computing task into a new block.

In an embodiment, the blockchain network may include a private blockchain, and a key required for recording data in the blockchain network may be generated in advance according to an asymmetric encryption algorithm standard and stored in a data warehouse. The computing node may access the data warehouse to obtain a related key when the key needs to be used. The asymmetric encryption algorithm may be an elliptic curve encryption algorithm, an RSA encryption algorithm (an asymmetric encryption algorithm), or the like.

In an embodiment, the computing node may generate a new block according to a corresponding consensus algorithm. The consensus algorithm may be a consensus hash algorithm or the like. The computing node may write global computing data corresponding to a completed unit computing task into a new block. In an embodiment, the computing node may write information, such as global data, a task execution log, exchanged data of a graph node, or a computing node status, into a new block.

In an embodiment, when a blockchain is a private chain, a quantity of bits of the consensus hash algorithm may be reduced, to improve processing efficiency, thereby improving system throughput. For example, when the quantity of bits of the consensus hash algorithm is reduced, a 128-bit secure hash algorithm (SHA) instead of a 256-bit SHA may be used. Alternatively, the consensus hash algorithm may be adjusted as a proof of stake (POS), and coin days=third quantized value*age are used for determining a producer of a next new block. Generally, when a quantity of graph data exchanges is more than 1 million times per second, the distributed graph computing system can achieve better communication efficiency. In an example, the following piecewise function may be used as a standard for a quantity of bits of the consensus hash function:

$$\text{Hash }(k) = \begin{cases} 128 & \overline{D_k}/\overline{C_k} > \eta \\ 64 & \overline{D_k}/\overline{C_k} \leq \eta, \overline{age(D_k)} < \delta \\ 32 & \text{otherwise} \end{cases}$$

where $\overline{D_k}$ represents an average third quantized value of graph nodes in a first computing node k providing to-be-exchanged graph nodes, $\overline{C_k}$ represents an average second quantized value of graph nodes in the first computing node k providing the to-be-exchanged graph nodes, $\overline{age(D_k)}$ represents average coin days of graph nodes in the first computing node k providing the to-be-exchanged graph nodes, and $\eta$ and $\delta$ are thresholds.

In an embodiment, each computing node may allow, by default, a computing node currently having the most first quantized value to generate a new block. In this case, generation of the first quantized value is allocated to a computing node with the least first quantized value, thereby achieving higher coordination efficiency. The first quantized value herein may alternatively be replaced with the second quantized value or the third quantized value.

In an embodiment, for the consensus hash function, complexity may also be controlled by limiting a quantity of consensus prefixes 0, and similar to control of a quantity of bits, a larger quantity of prefixes 0 of a constrain hash result indicates greater difficulty of a consensus problem.

Step 404. Add, after the new block is verified by a blockchain network, the new block into the blockchain network, form blockchain data, and generate a first quantized value corresponding to the unit computing task corresponding to the written global computing data.

In an embodiment, after a new block generated by a computing node is verified by a blockchain network, the computing node may add the new block to the blockchain network. In this case, global computing data written into the new block is formed into blockchain data. The computing node may generate a first quantized value corresponding to a unit computing task corresponding to the written global computing data.

In the foregoing embodiment, the global computing data corresponding to the completed unit computing task is written into the new block, the new block is added to the blockchain network, and the blockchain data is formed. After the new block is verified by the blockchain network, a first quantized value is rapidly and conveniently generated, and the first quantized value may be circulated and exchanged in the blockchain network.

In an embodiment, step 210 includes the following steps.

Step 502. Obtain latest global computing data from the blockchain network.

In an embodiment, the computing node may obtain latest global computing data recorded in a new block through the blockchain network. In an embodiment, the computing node may obtain latest global computing data from the blockchain network in a manner of regularly checking a new block.

Step 504. Obtain local computing data corresponding to the completed unit computing task.

In an embodiment, the computing node may read local computing data buffered locally, or obtain buffered local computing data from a neighboring computing node in a subgraph structure.

Step 506. Determine the third quantized value according to the subgraph data, a quantity of completed unit computing tasks, the global computing data, and the local computing data.

In an embodiment, the computing node may determine the third quantized value according to the subgraph data, the quantity of completed unit computing tasks, the global computing data, and the local computing data. For example, a third quantized value corresponding to a unit computing task of a graph node i may be calculated by using the following formula: $D_i^t = f(v_i, C_i^{t-s}; \Theta^t, \theta_i^t)$, where $D_i^t$ represents the third quantized value corresponding to the current unit computing task, $v_i$ represents the subgraph data, that is, attribute information of connected edges, graph nodes, and the like of a subgraph, $C_i^{t-s}$ represents a completed unit computing task at first s time points on which generating a current unit computing task depends, $\Theta^t$ is current global computing data, and $\theta_i^t$ is current local computing data.

In the foregoing embodiment, the third quantized value may be determined according to the subgraph data, the quantity of completed unit computing tasks, the latest global computing data, and the local computing data, and a load status of a computing node in a period in the future may be accurately and efficiently predicted. Even though a quantity of graph nodes in the subgraph data is changed dynamically, or a quantity of edges is increased dynamically, the current global computing data and local computing data are not affected. A computing node may further perform computing based on the completed computing task, thereby greatly improving graph data processing efficiency.

In an embodiment, the graph-data-based task scheduling method further includes a step of determining whether a second quantized value and a third quantized value meet an equilibrium condition, and the step may include the following steps.

Step 602. Obtain a first sum of current second quantized values of subgraph data.

In an embodiment, each computing node may determine all completed unit computing tasks that do not form blockchain data in subgraph data in a current computing node, and then determine a first sum of second quantized values.

Step 604. Obtain a second sum of current third quantized values of the subgraph data.

In an embodiment, each computing node may determine all uncompleted unit computing tasks in subgraph data in the current computing node, and then determine a second sum of third quantized values.

Step 606. Determine a contrast value between the second sum and the first sum.

In an embodiment, the computing node may perform a mathematical calculation on the first sum and the second sum to determine a contrast value between the second sum and the first sum. The mathematical calculation may be direct division of two numbers, division following logarithm-taking, subtraction, division following logarithm-taking another following another operation, or the like.

In an embodiment, considering that the second quantized value and the third quantized value increase exponentially with a time, the computing node may calculate a contrast value after taking logarithms of the second sum and the first sum. In this way, the contrast value of the second sum relative to the first sum may keep changing linearly.

In an embodiment, the computing node may calculate the contrast value according to the following formula:

$$\frac{\log_a^{m+|\sum_{i=1}^n D_i^t|}}{\log_a^{m+|\sum_{i=1}^n C_i^t|}}$$

where a and m are both constants; a>0, and a≠1; m≥1; $|\Sigma_{i=1}^{n} D_i^t|$ represents a second sum; and $|\Sigma_{i=1}^{n} C_i^t|$ represents a first sum.

In another embodiment, the second sum may be directly divided by the first sum to obtain the contrast value of the second sum relative to the first sum. In an embodiment, the computing node may calculate the contrast value according to the following formula:

$$\frac{\left|\sum_{i=1}^{n} D_i^t\right|}{\left|\sum_{i=1}^{n} C_i^t\right|}$$

where $|\Sigma_{i=1}^{n} D_i^t|$ represents a second sum, and $|\Sigma_{i=1}^{n} C_i^t|$ represents a first sum.

Step 608. Determine that the second quantized value and the third quantized value do not meet an equilibrium condition in a case that the contrast value is outside a specified range.

In an embodiment, a specified range may be preset. When the contrast value is outside the specified range, it is determined that the second quantized value and the third quantized value do not meet the equilibrium condition. When the contrast value falls within the specified range, it is determined that the second quantized value and the third quantized value meet the equilibrium condition.

In an embodiment, when the contrast value is a value obtained through division after logarithms of the second sum and the first sum are taken, a minimum value μ(t) and a maximum value λ(t) of the specified range are both linear decreasing functions that vary with a time t, and μ(t)<λ(t). For example, the contrast value falling within the specified range may be represented by using the following formula:

$$\mu(t) < \frac{\log_a^{m+|\Sigma_{i=1}^{n} D_i^t|}}{\log_a^{m+|\Sigma_{i=1}^{n} C_i^t|}} < \lambda(t)$$

In an exemplary embodiment, if a constant a may be 10 and a constant m is 1, the formula may be simplified as:

$$\mu(t) < \frac{\lg\left(1 + \left|\sum_{i=1}^{n} D_i^t\right|\right)}{\lg\left(1 + \left|\sum_{i=1}^{n} C_i^t\right|\right)} < \lambda(t)$$

In another embodiment, when the contrast value is a quotient of the second sum and the first sum, a minimum value μ(t) and a maximum value λ(t) of the specified range are power functions that vary with a time t, and μ(t)<λ(t). For example, the contrast value falling within the specified range may be represented by using the following formula:

$$\mu(t) < \frac{\left|\sum_{i=1}^{n} D_i^t\right|}{\left|\sum_{i=1}^{n} C_i^t\right|} < \lambda(t).$$

In an embodiment, the foregoing specified range may alternatively be a fixed range, for example, a fixed range determined by a first threshold and a second threshold.

In an embodiment, when a contrast value is less than the minimum value of the specified range, a first quantized value of a current computing node is exchanged for a graph node of another computing node, to keep the recalculated contrast value after the exchange within the specified range. When a contrast value is greater than the maximum value of the specified range, a graph node of a current computing node is exchanged for a first quantized value of another computing node, to keep the recalculated contrast value after the exchange within the specified range.

In an embodiment, when a contrast value is less than the minimum value of the specified range, a computing node attempts to obtain anew graph node by exchanging a first quantized value, and preferentially exchange fewer first quantized values to obtain a new graph node. When a contrast value is greater than the maximum value of the specified range, the computing node attempts to swap out owned graph nodes, and preferentially exchange the graph nodes that can be exchanged for more first quantized values In the foregoing embodiment, the contrast value is a contrast value of the second sum relative to the first sum. When the contrast value is less than the minimum value of the specified range, the first quantized value of the current computing node is exchanged for the graph node of the another computing node. When the contrast value is greater than the maximum value of the specified range, the graph node of the current computing node is exchanged for the first quantized value of the another computing node, to keep the recalculated contrast value after the exchange within the specified range. Correspondingly, the contrast value may alternatively be a contrast value of the first sum relative to the second sum. When the contrast value is greater than the maximum value of the specified range, the first quantized value of the current computing node is exchanged for the graph node of the another computing node. When the contrast value is less than the minimum value of the specified range, the graph node of the current computing node is exchanged for the first quantized value of the another computing node, to keep the recalculated contrast value after the exchange within the specified range.

In the foregoing embodiment, the contrast value between the first sum of the current second quantized values of the subgraph data and the second sum of the current third quantized values of the subgraph data is determined, and whether the contrast value falls within the specified range is determined. When the contrast value is outside the specified range, it is determined that the second quantized value and the third quantized value do not meet the equilibrium condition. In this way, whether the second quantized value and the third quantized value meet the equilibrium condition may be rapidly and accurately determined, to efficiently exchange the graph node and the first quantized value between the computing nodes, and the graph node are allocated dynamically through coordination between the computing nodes, thereby efficiently implementing self-organized load balancing.

In an embodiment, a step of exchanging a graph node and a first quantized value with another computing node may include the following steps.

Step 702. Select a first computing node providing a to-be-exchanged graph node and a second computing node exchanging for the to-be-exchanged graph node from the computing node and the another computing node.

In an embodiment, when a second quantized value and a third quantized value in a computing node do not meet an equilibrium condition, the computing nodes may exchange a graph node and a first quantized value with each other, to keep that the second quantized value and the third quantized value in each computing node meet the equilibrium condition. That is, a current computing node may exchange a graph node and a first quantized value with another computing node. In this way, a first computing node providing a to-be-exchanged graph node and a second computing node exchanging for the to-be-exchanged graph node need to be determined between computing nodes that are about to perform an exchange d.

Step 704. Determine a first estimated quantized value of the to-be-exchanged graph node estimated by the first computing node.

The estimated quantized value is an estimated value obtained by quantizing an uncompleted unit computing task owned by a to-be-exchanged graph node. The first estimated quantized value is a value obtained by that a first computing node providing a to-be-exchanged graph node quantizes an uncompleted unit computing task owned by the to-be-exchanged graph node. The estimated quantized value and the first quantized value have the same unit.

In an embodiment, when a computing node is the first computing node, the computing node may determine a first estimated quantized value according to a relationship between a second quantized value corresponding to the to-be-exchanged graph node and a second quantized value corresponding to the first computing node and according to a relationship between a third quantized value corresponding to the to-be-exchanged graph node and a third quantized value corresponding to the first computing node.

In an embodiment, the computing node may calculate the first estimated quantized value according to the following formula:

$$y_1(v_i, k) = \alpha e^{-\beta \frac{D_i - \overline{D_k}}{C_i - \overline{C_k}}}$$

where $v_i$ represents a to-be-exchanged graph node, k represents a first computing node, $y_1(v_i, k)$ represents a first estimated quantized value obtained by the first computing node for the to-be-exchanged graph node, $D_i$ represents a third quantized value of the to-be-exchanged graph node, $C_i$ represents a second quantized value of the to-be-exchanged graph node, $\overline{D_k}$ represents an average third quantized value of graph nodes in the first computing node k, $\overline{C_k}$ represents an average second quantized value of the graph nodes in the first computing node k, $\alpha$ and $\beta$ are system parameters, and e is a natural constant.

Step 706. Determine a second estimated quantized value of the to-be-exchanged graph node estimated by the second computing node.

The second estimated quantized value is a value obtained by that a second computing node exchanging for a to-be-exchanged graph node quantizes an uncompleted unit computing task owned by the to-be-exchanged graph node.

In an embodiment, in a case that a computing node is the second computing node, when determining a second estimated quantized value, the computing node may consider, after the to-be-exchanged graph node is exchanged for, an added computation task and a reduced communication distance amount required by the computing node corresponding to the second computing node. Therefore, the computing node may determine the second estimated quantized value according to a third quantized value of the to-be-exchanged graph node and a communication distance between the to-be-exchanged graph node and the graph node in the second computing node.

In an embodiment, the computing node may calculate the second estimated quantized value according to the following formula:

$$y_2(v_i, 1) = \alpha e^{-\gamma D_i + \Sigma_{j \in 1} dist(i,j)}$$

where $v_i$ represents the to-be-exchanged graph node, 1 represents the second computing node, $y_2(v_i,1)$ represents the second estimated quantized value of the to-be-exchanged graph node estimated by the second computing node, $D_i$ represents the third quantized value of the to-be-exchanged graph node, and $\Sigma_{j \in 1} dist(i,j)$ represents a sum of communication distances between a graph node j in the second computing node 1 and the to-be-exchanged graph node i.

In an embodiment, dist(i,j) may represent a communication distance between the graph node i and the graph node j. Because of a large calculation amount for calculating a communication distance between any two graph nodes in graph data, the computing node calculates a communication distance between graph nodes by using an approximation method in mathematics. For example, the communication distance between the graph nodes may be calculated by using a local approximation method. The communication distance between the graph nodes may be calculated according to the following formula:

$$dist(i,j) \overset{def}{=} \begin{cases} 1, e_{i,j} \in E \\ 0, e_{i,j} \notin E \end{cases}$$

where dist(i,j) represents a communication distance between the graph node j in the second computing node 1 and the to-be-exchanged graph node i, $e_{i,j} \in E$ means that the graph node j is connected to the graph node i through an edge, and $e_{i,j} \notin E$ means that there is no edge between the graph node j and the graph node i.

That is, when the graph node i is connected to the graph node j through the edge, it may be approximately considered that a distance between the graph node i and the graph node j is very short. After a computing node corresponding to the second computing node exchanges for the to-be-exchanged graph node, the computing node may reduce the communication distance. Therefore, the second estimated quantized value is higher. When the graph node i and the graph node j are connected without an edge, after a computing node corresponding to the second computing node exchanges for the to-be-exchanged graph node, the computing node does not reduce the communication distance.

In an embodiment, the computing node may alternatively calculate the communication distance between the graph nodes by using other approximation methods, for example, determining whether there is a common neighboring graph node between two to-be-calculated graph nodes. When there is a common neighboring graph node between the two graph nodes, it may be considered that a communication distance between the two graph nodes is short. After a computing node corresponding to the second computing node exchanges for the to-be-exchanged graph node, the computing node reduces a larger amount of communication. In another example, the computing node may generate a road between every two graph nodes according to a probabilistic road map method, and graph nodes on the same road are considered to have a short communication distance. After a computing node corresponding to the second computing node exchanges for the to-be-exchanged graph node, the computing node reduces a larger amount of communication.

Step 708. Determine, according to the first estimated quantized value and the second estimated quantized value, a first quantized value used for exchanging for the to-be-exchanged graph node.

In an embodiment, the computing node may determine, according to the first estimated quantized value and the second estimated quantized value, a first quantized value used for exchanging for the to-be-exchanged graph node. For example, the computing node may calculate an average value of the first estimated quantized value and the second estimated quantized value, and use the average value as a first quantized value for exchanging for the to-be-exchanged graph node. Alternatively, the computing node may perform, according to a specific weight ratio, weighted summation on the first estimated quantized value and the second estimated quantized value, then obtain an average value, and use the average value as a first quantized value for exchanging for the to-be-exchanged graph node.

Step 710. Exchange the to-be-exchanged graph node and the determined first quantized value between the computing node and the another computing node.

In an embodiment, between computing nodes that are about to perform an exchange, the second computing node may exchange the determined first quantized value for the to-be-exchanged graph node of the first computing node.

In the foregoing embodiment, the first quantized value used for exchanging for the to-be-exchanged graph node is determined according to the first estimated quantized value of the to-be-exchanged graph node estimated by the first computing node and the second estimated quantized value of the to-be-exchanged graph node estimated by the second computing node. In this way, actual situations of the first computing node and the second computing node may be comprehensively considered, and the to-be-exchanged graph node and the first quantized value are exchanged fairly between the computing nodes that are about to perform an exchange.

Figure 8:
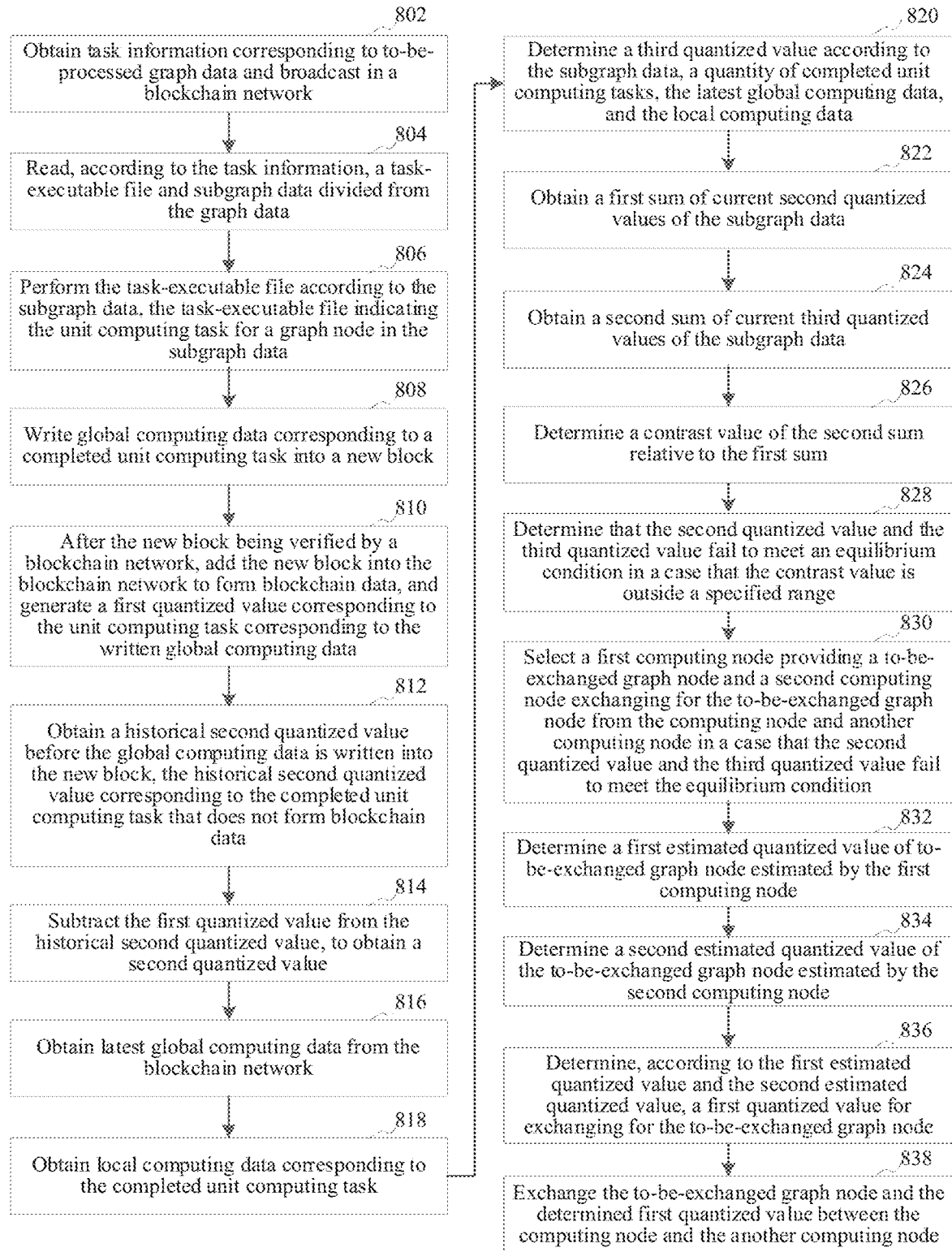
FIG. 8 is a schematic flowchart of a graph-data-based task scheduling method in another embodiment.

As shown in FIG. 8, in an exemplary embodiment, a graph-data-based task scheduling method includes the following steps:

Step 802. Obtain task information corresponding to to-be-processed graph data and broadcast in a blockchain network.

Step 804. Read, according to the task information, a task executable file and subgraph data divided from the graph data.

Step 806. Perform the task-executable file according to the subgraph data, the task-executable file being used for indicating a unit computing task for a graph node in the subgraph data.

Step 808. Write global computing data corresponding to a completed unit computing task into a new block.

Step 810. Add, after the new block is verified by a blockchain network, the new block into the blockchain network, form blockchain data, and generate a first quantized value corresponding to the unit computing task corresponding to the written global computing data.

812. Obtain a historical second quantized value before the global computing data is written into the new block, the historical second quantized value corresponding to the completed unit computing task that does not form blockchain data before the global computing data is written into the new block.

Step 814. Subtract the first quantized value from the historical second quantized value, to obtain a second quantized value.

Step 816. Obtain latest global computing data from the blockchain network.

Step 818. Obtain local computing data corresponding to the completed unit computing task.

Step 820. Determine the third quantized value according to the subgraph data, a quantity of completed unit computing tasks, the global computing data, and the local computing data.

Step 822. Obtain a first sum of current second quantized values of subgraph data.

Step 824. Obtain a second sum of current third quantized values of the subgraph data.

Step 826. Determine a contrast value between the second sum and the first sum.

Step 828. Determine that the second quantized value and the third quantized value do not meet an equilibrium condition in a case that the contrast value is outside a specified range.

Step 830. When the second quantized value and the third quantized value do not meet the equilibrium condition, select a first computing node providing a to-be-exchanged graph node and a second computing node exchanging for the to-be-exchanged graph node from the computing node and another computing node.

Step 832. Determine a first estimated quantized value of the to-be-exchanged graph node estimated by the first computing node.

Step 834. Determine a second estimated quantized value of the to-be-exchanged graph node estimated by the second computing node.

Step 836. Determine, according to the first estimated quantized value and the second estimated quantized value, a first quantized value used for exchanging for the to-be-exchanged graph node.

Step 838. Exchange the to-be-exchanged graph node and the determined first quantized value between the computing node and the another computing node.

In the graph-data-based task scheduling method, to-be-processed graph data is divided into a plurality of pieces of subgraph data, and distributed processing is performed on the plurality of pieces of subgraph data, thereby greatly improving graph data processing efficiency. A first quantized value, a second quantized value, and a third quantized value are obtained separately, and when the second quantized value and the third quantized value do not meet an equilibrium condition, a graph node and the first quantized value are exchanged between a computing node and another computing node. The first quantized value and the second quantized value may measure a computing capacity of the computing node, and the third quantized value may measure a load status of the computing node. In this way, the computing capacity and the load status of the computing node may be quantitatively indicated by using quantized values corresponding to a unit computing tasks, which is accurate and intuitive. The graph nodes and the first quantized values are exchanged between the computing node and the another computing node, to keep that the second quantized value and the third quantized value meet the equilibrium condition. In this way, instead of relying on a specific server or node for task allocation, computing nodes cooperate with each other to allocate graph nodes, and dynamically adjust the allocation, to implement self-organized load balancing and avoid problems of single point of failure and network congestion of the specific server, thereby greatly improving task scheduling efficiency. Moreover, such a self-organized dynamic task scheduling method can adapt to computing task scheduling of a larger-scale cluster, and a dynamic increase or decrease of a quantity of computing nodes does not affect existing computing tasks, so that high scalability is achieved.

FIG. 8 is a schematic flowchart of a graph-data-based task scheduling method in an embodiment. It is to be understood that although the steps in the flowchart of FIG. 8 are sequentially displayed in accordance with indications of arrows, the steps are not necessarily performed sequentially in the order indicated by the arrows. Unless explicitly specified in this disclosure, the sequence of the steps is not strictly limited, and the steps may be performed in other sequences. Moreover, at least some of the steps in FIG. 8 may include a plurality of sub-steps or a plurality of stages. The sub-steps or stages are not necessarily performed at the same moment, but may be performed at different times. The sub-steps or stages are not necessarily executed sequentially, but may be performed with at least one part of the other steps or sub-steps of other steps or stages in turn.

In an exemplary application scenario, for example, in a traveling salesman problem (TSP), a relatively optimized solution may be efficiently obtained by using the foregoing graph-data-based task scheduling method. The TSP means how a salesman covers all cities (graph nodes) in the shortest distance and returns to a starting city. This is a non-deterministic polynomial (NP) complete problem, and an approximate solution of the problem is usually obtained. According to the graph-data-based task scheduling method in the solution, the TSP may be split into a shortest traversing problem in a subgraph, that is, a global optimal solution is approached approximately by looking for a local optimal solution. The global computing data is a path in the graph data and a total length, and the local computing data includes a relatively good path length in each piece of subgraph data and graph nodes entering and leaving the subgraph. The computing process is a process of continuously optimizing the path selection, the computing nodes coordinate with each other to dynamically allocate graph nodes, to obtain optimal subgraph division under an optimal condition and obtain an optimal solution under the condition.

For ease of understanding, the following describes the implementation process by using a vivid example. It may be understood that, each currency in a blockchain corresponds to a completed unit computing task, and each computing node may be driven by an algorithm to continuously generate unit computing tasks that need to be completed, that is, a liability producer. The graph nodes may be exchanged by using the currency between different computing nodes, and such a process generally includes a self-organizing policy. The simplest self-organizing policy is self-financing, that is, when a task volume generated by graph nodes owned by a computing node per unit time exceeds an average task volume generated by surrounding computing nodes, the computing node is in an accelerated liability state, and the graph nodes of the computing node need to be "sold" to achieve self-financing, that is, a process of balancing uncompleted unit computing tasks (liabilities) and completed unit computing tasks (assets). The computing node with an asset surplus may achieve maximum utilization of a computing capacity by "buying" more graph nodes. In this way, an objective of each computing node is to balance liabilities and assets. An asset portfolio of a computing node k may be formed by a triplet $\langle \{V_i\}_{i=k1}^{kn}, \{C_i\}_{i=k1}^{kn}, \{D_i\}_{i=k1}^{kn} \rangle$, which represents graph nodes owned by the computing node k and assets (completed unit computing tasks) and liabilities (uncompleted unit computing tasks) corresponding to the graph nodes.

The graph nodes are traded according to a final trading price, that is, an average value of a selling price and a purchase price. During the trade, a purchaser actually sends a purchase price quantity of blockchain currencies C to a seller. Although the currency C herein has the same unit as the asset and the liability of the graph node mentioned above, the currency is different from the asset and the liability. The currency herein is a currency that is actually registered by the blockchain and that can be circulated, while the asset and the liability mentioned above are future redeemable assets in an account. In short, provided that a liability ratio of a computing node does not exceed a specified value, each $C_i$ may be converted into an actual currency C through accounting. The process of accounting is a process in which a computing node records all transaction information (herein including a log, a global computing parameter, and a node status report) from a previous block to a current time to a new block by adding the new block, attaches the new block to the end of the blockchain, and obtains a specific amount of currency C as a reward. A value of the reward is written down from the asset of the computing node.

Figure 9:
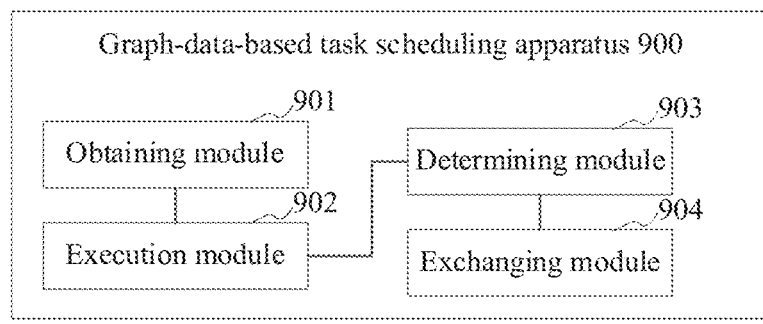
FIG. 9 is a structural block diagram of a graph-data-based task scheduling apparatus in an embodiment.

As shown in FIG. 9, in an embodiment, a graph-data-based task scheduling apparatus 900 is provided, including: an obtaining module 901, an execution module 902, a determining module 903, and an exchanging module 904.

The obtaining module 901 is configured to obtain subgraph data divided from to-be-processed graph data.

The execution module 902 is configured to perform a unit computing task for a graph node in the subgraph data obtained by the obtaining module 901.

The obtaining module 901 is further configured to obtain a first quantized value, the first quantized value being a quantized value corresponding to a completed unit computing task in a case that data corresponding to the completed unit computing task is formed into blockchain data.

The obtaining module 901 is further configured to obtain a second quantized value, the second quantized value being a quantized value corresponding to the completed unit computing task in a case that the data corresponding to the completed unit computing task is not formed into the blockchain data.

The determining module 903 is configured to determine a third quantized value corresponding to an uncompleted unit computing task in the subgraph data.

The exchanging module 904 is configured to exchange the graph node and the first quantized value with another computing node in a case that the second quantized value obtained by the obtaining module 901 and the third quantized value obtained by the determining module 903 do not meet an equilibrium condition.

In an embodiment, the obtaining module 901 is further configured to obtain task information corresponding to graph data and broadcast in a blockchain network, and read, according to the task information, a task-executable file and the subgraph data divided from the graph data. The execution module 902 is further configured to perform the task-executable file according to the subgraph data, the task-executable file being used for indicating the unit computing task for a graph node in the subgraph data.

In an embodiment, the obtaining module 901 is further configured to write global computing data corresponding to the completed unit computing task into a new block, add the new block into the blockchain network after the new block is verified by the blockchain network, form blockchain data, and generate a first quantized value corresponding to the unit computing task corresponding to the written global computing data.

In an embodiment, the obtaining module 901 is further configured to obtain a historical second quantized value before the global computing data is written into the new block, the historical second quantized value corresponding to the completed unit computing task that does not form blockchain data before the global computing data is written into the new block, and subtract the first quantized value from the historical second quantized value, to obtain the second quantized value.

In an embodiment, the determining module 903 is further configured to obtain latest global computing data from a blockchain network, obtain local computing data corresponding to the completed unit computing task, and determine a third quantized value according to the subgraph data, a quantity of completed unit computing tasks, the global computing data, and the local computing data.

In an embodiment, the obtaining module 901 is further configured to obtain a first sum of current second quantized values of the subgraph data, and obtain a second sum of current third quantized values of the subgraph data. The determining module 903 is further configured to determine a contrast value of the second sum relative to the first sum, and determine that the second quantized value and the third quantized value do not meet the equilibrium condition in a case that the contrast value is outside a specified range.

In an embodiment, the determining module 903 is further configured to calculate the contrast value according to the following formula:

$$\frac{\log_a^{m+|\sum_{i=1}^n D_i^t|}}{\log_a^{m+|\sum_{i=1}^n C_i^t|}}$$

where a and m are both constants; a>0, and a≠1; m≥1; $D_i$ represents a third quantized value of the to-be-exchanged graph node: $C_i$ represents a second quantized value of the to-be-exchanged graph node; $|\sum_{i=1}^n D_i^t|$ represents a second sum; and $|\sum_{i=1}^n C_i^t|$ represents a first sum.

In an embodiment, a minimum value μ(t) and a maximum value λ(t) of the specified range are linear decreasing functions that vary with a time t, and μ(t)<λ(t).

In an embodiment, the exchanging module 904 is further configured to exchange the first quantized value for a graph node of the another computing node in a case that the contrast value is less than the minimum value of the specified range, the contrast value after the exchange falling within the specified range, and exchange the graph node for a first quantized value of the another computing node in a case that the contrast value is greater than the maximum value of the specified range, the contrast value after the exchange falling within the specified range.

In an embodiment, the exchanging module 904 is further configured to determine, between the computing node and the another computing node, a first computing node providing a to-be-exchanged graph node and a second computing node exchanging for the to-be-exchanged graph node, determine a first estimated quantized value of the to-be-exchanged graph node estimated by the first computing node, determine a second estimated quantized value of the to-be-exchanged graph node estimated by the second computing node, determine, according to the first estimated quantized value and the second estimated quantized value, a first quantized value used for exchanging for the to-be-exchanged graph node, and exchange the to-be-exchanged graph node and the determined first quantized value between the computing node and the another computing node.

Figure 10:
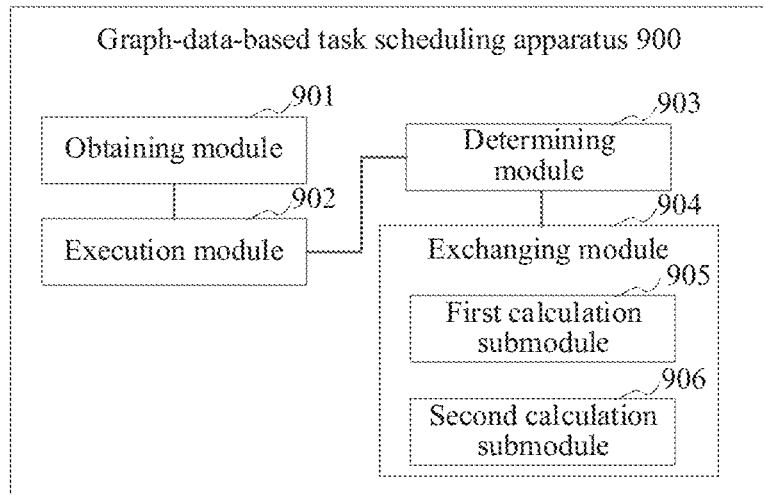
FIG. 10 is a structural block diagram of a graph-data-based task scheduling apparatus in another embodiment.

As shown in FIG. 10, in an embodiment, the exchanging module 904 further includes a first calculation submodule 905, configured to calculate the first estimated quantized value according to the following formula:

$$y_1(v_i, k) = \alpha e^{-\beta \frac{D_i - \overline{D_k}}{C_i - \overline{C_k}}}$$

where $v_i$ represents a to-be-exchanged graph node, k represents a first computing node, $y_1(v_i,k)$ represents a first estimated quantized value obtained by the first computing node for the to-be-exchanged graph node, $D_i$ represents a third quantized value of the to-be-exchanged graph node, $C_i$ represents a second quantized value of the to-be-exchanged graph node, $\overline{D_k}$ represents an average third quantized value of graph nodes in the first computing node k, $\overline{C_k}$ represents an average second quantized value of the graph nodes in the first computing node k, α and β are system parameters, and e is a natural constant.

In an embodiment, the exchanging module 904 further includes:

a second calculation submodule 906, configured to calculate the second estimated quantized value according to the following formula:

$$y_2(v_i, 1) = \alpha e^{-\gamma D_i + \sum_{j \in 1} dist(i,j)}$$

where $v_i$ represents the to-be-exchanged graph node, 1 represents the second computing node, $y_2(v_i,1)$ represents the second estimated quantized value of the to-be-exchanged graph node estimated by the second computing node, $D_i$ represents the third quantized value of the to-be-exchanged graph node, and $\sum_{j \in 1} dist(i,j)$ represents a sum of communication distances between a graph node j in the second computing node 1 and the to-be-exchanged graph node i.

In an embodiment, the second calculation submodule 906 is further configured to calculate the communication distance according to the following formula:

$$dist(i, j) \stackrel{def}{=} \begin{cases} 1, & e_{i,j} \in E \\ 0, & e_{i,j} \notin E \end{cases}$$

where dist(i,j) represents a communication distance between the graph node j in the second computing node 1 and the to-be-exchanged graph node i, $e_{i,j} \in E$ means that the graph node j is connected to the graph node i through an edge, and $e_{i,j} \notin E$ means that there is no edge between the graph node j and the graph node i.

In the graph-data-based task scheduling apparatus, to-be-processed graph data is divided into a plurality of pieces of subgraph data, and distributed processing is performed on the plurality of pieces of subgraph data, thereby greatly improving graph data processing efficiency. A first quantized value, a second quantized value, and a third quantized value are obtained separately, and when the second quantized value and the third quantized value do not meet an equilibrium condition, a graph node and the first quantized value are exchanged between a computing node and another computing node. The first quantized value and the second quantized value may measure a computing capacity of the computing node, and the third quantized value may measure a load status of the computing node. In this way, the computing capacity and the load status of the computing node may be quantitatively indicated by using quantized values corresponding to a unit computing tasks, which is accurate and intuitive. The graph nodes and the first quantized values are exchanged between the computing node and the another computing node, to keep that the second quantized value and the third quantized value meet the equilibrium condition. In this way, instead of relying on a specific server or node for task allocation, computing nodes cooperate with each other to allocate graph nodes, and dynamically adjust the allocation, to implement self-organized load balancing and avoid problems of single point of failure and network congestion of the specific server, thereby greatly improving task scheduling efficiency. Moreover, such a self-organized dynamic task scheduling method can adapt to computing task scheduling of a larger-scale cluster, and a dynamic increase or decrease of a quantity of computing nodes does not affect existing computing tasks, so that high scalability is achieved.

Figure 11:
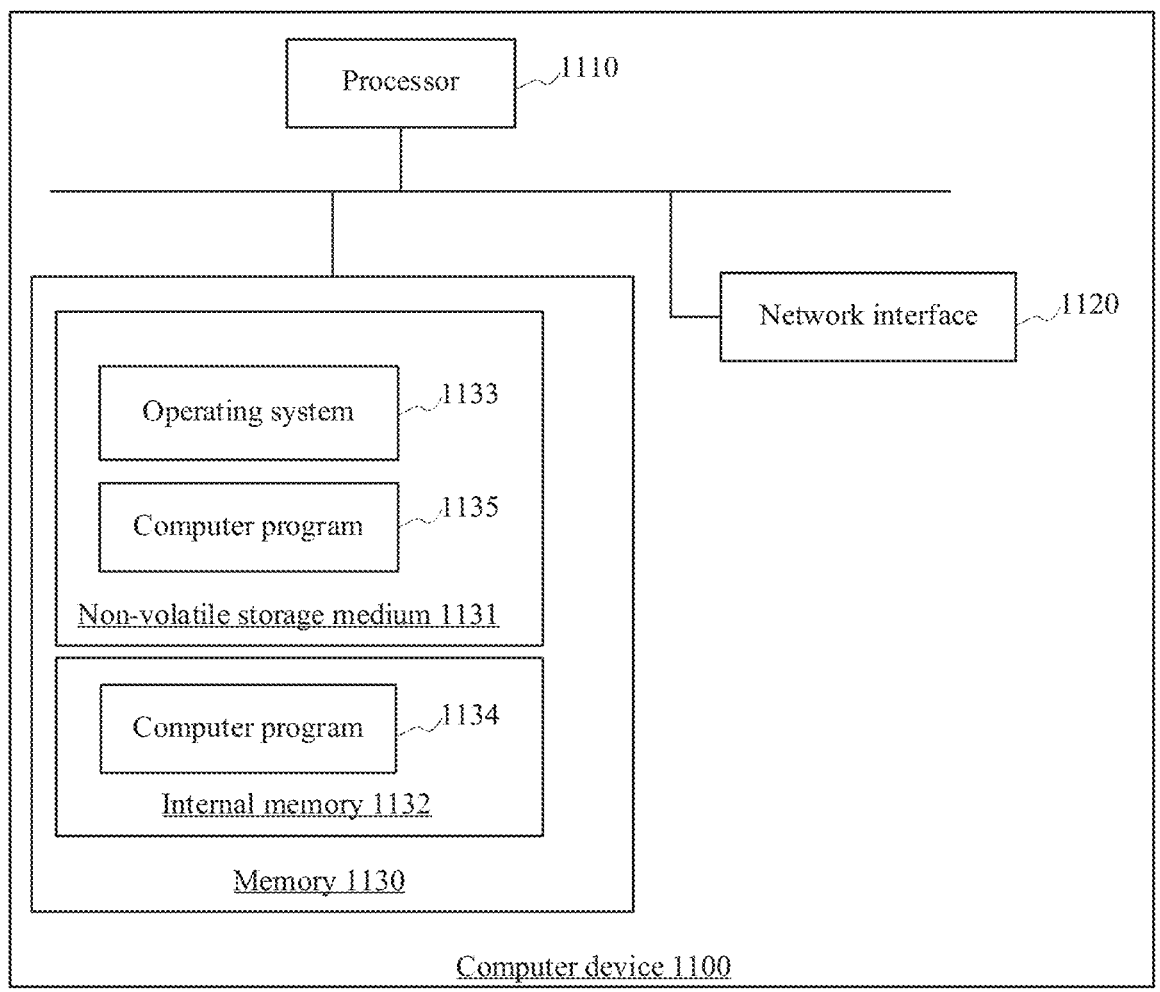
FIG. 11 is a structural block diagram of a computer device in an embodiment.

FIG. 11 shows a diagram of an internal structure of a computer device 1100 according to an embodiment. The computer device 1100 may be a computer device distributed on the computing nodes 120 in FIG. 1. As shown in FIG. 11, the computer device 1100 includes a processor 1110, a memory 1130, and a network interface 1120 that are connected through a system bus. The memory 1130 includes a non-volatile storage medium 1131 and an internal memory 1132. The non-volatile storage medium 1131 of the computer device 1100 stores an operating system 1133 and may further store a computer program 1135, the computer program 1135, when executed by the processor 1110, causing the processor 1110 to implement the graph-data-based task scheduling method. The internal memory 1132 may also store a computer program 1134, the computer program 1134, when executed by the processor, causing the processor 1110 to perform the graph-data-based task scheduling method.

A person skilled in the art may understand that, the structure shown in FIG. 11 is only a block diagram of a partial structure related to the solution in this disclosure, and does not limit the computer device to which the solution of this disclosure is applied. Specifically, the computer device may include more components or fewer components than those shown in the figure, or some components may be combined, or a different component deployment may be used.

In an embodiment, the graph-data-based task scheduling apparatus provided in this disclosure may be implemented in a form of a computer program, and the computer program may be run on the computer device shown in FIG. 11. The memory of the computer device may store program modules forming the graph-data-based task scheduling apparatus, for example, the obtaining module, the execution module, the determining module, and the exchanging module shown in FIG. 9. A computer program formed by the program modules causes the processor to perform the steps in the graph-data-based task scheduling method in the embodiments of this disclosure described in this specification.

For example, the computer device shown in FIG. 11 may perform steps 202, 206, and 208 through the obtaining module in the graph-data-based task scheduling apparatus shown in FIG. 9. The computer device may perform step 204 through the execution module. The computer device may perform step 210 through the determining module. The computer device may perform step 212 through the exchanging module, and for details, reference may be made to descriptions of the foregoing steps.

In an embodiment, a computer device is provided, including a memory and a processor, the memory storing a computer program, the computer program, when executed by the processor, causing the processor to perform the following steps: obtaining subgraph data divided from to-be-processed graph data, performing a unit computing task for a graph node in the subgraph data, obtaining a first quantized value, the first quantized value being a quantized value corresponding to a completed unit computing task in a case that data corresponding to the completed unit computing task is formed into blockchain data, obtaining a second quantized value, the second quantized value being a quantized value corresponding to the completed unit computing task in a case that the data corresponding to the completed unit computing task is not formed into blockchain data, determining a third quantized value corresponding to an uncompleted unit computing task in the subgraph data, and exchanging the graph node and the first quantized value with another computing node in a case that the second quantized value and the third quantized value do not meet an equilibrium condition.

In an embodiment, when the computer program causes the processor to perform a step of obtaining subgraph data divided from to-be-processed graph data, the following steps may be performed: obtaining task information corresponding to the graph data and broadcast in a blockchain network, and reading, according to the task information, a task-executable file and the subgraph data divided from the graph data. When the computer program causes the processor to perform a step of performing a unit computing task for a graph node in the subgraph data, the following step may be performed: performing the task-executable file according to the subgraph data, the task-executable file being used for indicating the unit computing task for the graph node in the subgraph data.

In an embodiment, when the computer program causes the processor to perform a step of obtaining a first quantized value, the following steps may be performed: writing global computing data corresponding to the completed unit computing task into a new block, adding, after the new block is verified by a blockchain network, the new block into the blockchain network, forming blockchain data, and generating a first quantized value corresponding to the unit computing task corresponding to the written global computing data.

In an embodiment, when the computer program causes the processor to perform a step of obtaining a second quantized value, the following steps may be performed: obtaining a historical second quantized value before the global computing data is written into the new block, the historical second quantized value corresponding to the completed unit computing task that does not form blockchain data before the global computing data is written into the new block, and subtracting the first quantized value from the historical second quantized value, to obtain the second quantized value.

In an embodiment, when the computer program causes the processor to perform a step of determining a third quantized value corresponding to an uncompleted unit computing task in the subgraph data, the following steps may be performed: obtaining latest global computing data from a blockchain network, obtaining local computing data corresponding to the completed unit computing task, and determining the third quantized value according to the subgraph data, a quantity of completed unit computing tasks, the global computing data, and the local computing data.

In an embodiment, the computer program further causes the processor to perform the following steps: obtaining a first sum of current second quantized values of the subgraph data, obtaining a second sum of current third quantized values of the subgraph data, determining a contrast value of the second sum relative to the first sum, and determining that the second quantized value and the third quantized value do not meet the equilibrium condition in a case that the contrast value is outside a specified range.

In an embodiment, when the computer program causes the processor to perform a step of determining a contrast value of the second sum relative to the first sum, the following step may be performed: calculating the contrast value according to the following formula:

$$\frac{\log_a{}^{m+|\sum_{i=1}^n D_i^t|}}{\log_a{}^{m+|\sum_{i=1}^n C_i^t|}}$$

where a and m are both constants; a>0, and a≠1; m≥1; $D_i$ represents a third quantized value of the to-be-exchanged graph node; $C_i$ represents a second quantized value of the to-be-exchanged graph node; $|\Sum_{i=1}^n D_i^t|$ represents a second sum; and $|\Sum_{i=1}^n C_i^t|$ represents a first sum.

In an embodiment, a minimum value μ(t) and a maximum value λ(t) of the specified range are linear decreasing functions that vary with a time t, and μ(t)<λ(t).

In an embodiment, when the computer program causes the processor to perform a step of exchanging the graph node and the first quantized value with another computing node, the following steps may be performed: exchanging the first quantized value with the graph node of the another computing node in a case that the contrast value is less than the minimum value of the specified range, the contrast value after the exchange falling within the specified range, and exchanging the graph node with the first quantized value of the another computing node in a case that the contrast value is greater than the maximum value of the specified range, the contrast value after the exchange falling within the specified range.

In an embodiment, when the computer program causes the processor to perform a step of exchanging the graph node and the first quantized value with another computing node, the following steps may be performed: determining, between the computing node and the another computing node, a first computing node providing a to-be-exchanged graph node and a second computing node exchanging for the to-be-exchanged graph node, determining a first estimated quantized value of the to-be-exchanged graph node estimated by the first computing node, determining a second estimated quantized value of the to-be-exchanged graph node estimated by the second computing node, determining, according to the first estimated quantized value and the second estimated quantized value, a first quantized value used for exchanging for the to-be-exchanged graph node, and exchanging the to-be-exchanged graph node and the determined first quantized value between the computing node and the another computing node.

In an embodiment, when the computer program causes the processor to perform a step of determining a first estimated quantized value of the to-be-exchanged graph node estimated by the first computing node, the following step may be performed: calculating the first estimated quantized value according to the following formula:

$$y_1(v_i, k) = \alpha e^{-\beta \frac{D_i - \overline{D_k}}{C_i - \overline{C_k}}}$$

where $v_i$ represents a to-be-exchanged graph node, k represents a first computing node, $y_1(v_i, k)$ represents a first estimated quantized value obtained by the first computing node for the to-be-exchanged graph node, $D_i$ represents a third quantized value of the to-be-exchanged graph node, $C_i$ represents a second quantized value of the to-be-exchanged graph node, $\overline{D_k}$ represents an average third quantized value of graph nodes in the first computing node k, $\overline{C_k}$ represents an average second quantized value of the graph nodes in the first computing node k, α and β are system parameters, and e is a natural constant.

In an embodiment, when the computer program causes the processor to perform a step of determining a second estimated quantized value of the to-be-exchanged graph node estimated by the second computing node, the following step may be performed: calculating the second estimated quantized value according to the following formula:

$$y_2(v_i, l) = \alpha e^{-\gamma D_i + \Sum_{j \in l} dist(i,j)}$$

where $v_i$ represents the to-be-exchanged graph node, l represents the second computing node, $y_2(v_i,l)$ represents the second estimated quantized value of the to-be-exchanged graph node estimated by the second computing node, $D_i$ represents the third quantized value of the to-be-exchanged graph node, and $\Sum_{j \in l} dist(i,j)$ represents a sum of communication distances between a graph node j in the second computing node l and the to-be-exchanged graph node i.

In an embodiment, when the computer program causes the processor to perform a step of determining a communication distance between a graph node in the second computing node exchanging for the to-be-exchanged graph node and the to-be-exchanged graph node, the following step may be performed: calculating the communication distance according to the following formula:

$$dist(i, j) \overset{def}{=} \begin{cases} 1, e_{i,j} \in E \\ 0, e_{i,j} \notin E \end{cases}$$

where dist(i,j) represents a communication distance between the graph node j in the second computing node l and the to-be-exchanged graph node i, $e_{i,j} \in E$ means that the graph node j is connected to the graph node i through an edge, and $e_{i,j} \notin E$ means that there is no edge between the graph node j and the graph node i.

The computer device divides to-be-processed graph data into a plurality of pieces of subgraph data, and performs distributed processing on the plurality of pieces of subgraph data, thereby greatly improving graph data processing efficiency. A first quantized value, a second quantized value, and a third quantized value are obtained separately, and when the second quantized value and the third quantized value do not meet an equilibrium condition, a graph node and the first quantized value are exchanged between a computing node and another computing node. The first quantized value and the second quantized value may measure a computing capacity of the computing node, and the third quantized value may measure a load status of the computing node. In this way, the computing capacity and the load status of the computing node may be quantitatively indicated by using quantized values corresponding to a unit computing tasks, which is accurate and intuitive. The graph nodes and the first quantized values are exchanged between the computing node and the another computing node, to keep that the second quantized value and the third quantized value meet the equilibrium condition. In this way, instead of relying on a specific server or node for task allocation, computing nodes cooperate with each other to allocate graph nodes, and dynamically adjust the allocation, to implement self-organized load balancing and avoid problems of single point of failure and network congestion of the specific server, thereby greatly improving task scheduling efficiency. Moreover, such a self-organized dynamic task scheduling method can adapt to computing task scheduling of a larger-scale cluster, and a dynamic increase or decrease of a quantity of computing nodes does not affect existing computing tasks, so that high scalability is achieved.

A computer-readable storage medium is provided, storing a computer program, the computer program, when executed by a processor, causing the processor to implement the following steps: obtaining subgraph data divided from to-be-processed graph data, performing a unit computing task for a graph node in the subgraph data, obtaining a first quantized value, the first quantized value being a quantized value corresponding to a completed unit computing task in a case that data corresponding to the completed unit computing task is formed into blockchain data, obtaining a second quantized value, the second quantized value being a quantized value corresponding to the completed unit computing task in a case that the data corresponding to the completed unit computing task is not formed into blockchain data, determining a third quantized value corresponding to an uncompleted unit computing task in the subgraph data, and exchanging the graph node and the first quantized value with another computing node in a case that the second quantized value and the third quantized value do not meet an equilibrium condition.

In an embodiment, when the computer program causes the processor to perform a step of obtaining subgraph data divided from to-be-processed graph data, the following steps may be performed: obtaining task information corresponding to the graph data and broadcast in a blockchain network, and reading, according to the task information, a task-executable file and the subgraph data divided from the graph data. When the computer program causes the processor to perform a step of performing a unit computing task for a graph node in the subgraph data, the following step may be performed: performing the task-executable file according to the subgraph data, the task-executable file being used for indicating the unit computing task for the graph node in the subgraph data.

In an embodiment, when the computer program causes the processor to perform a step of obtaining a first quantized value, the following steps may be performed: writing global computing data corresponding to the completed unit computing task into a new block, adding, after the new block is verified by a blockchain network, the new block into the blockchain network, forming blockchain data, and generating a first quantized value corresponding to the unit computing task corresponding to the written global computing data.

In an embodiment, when the computer program causes the processor to perform a step of obtaining a second quantized value, the following steps may be performed: obtaining a historical second quantized value before the global computing data is written into the new block, the historical second quantized value corresponding to the completed unit computing task that does not form blockchain data before the global computing data is written into the new block, and subtracting the first quantized value from the historical second quantized value, to obtain the second quantized value.

In an embodiment, when the computer program causes the processor to perform a step of determining a third quantized value corresponding to an uncompleted unit computing task in the subgraph data, the following steps may be performed: obtaining latest global computing data from a blockchain network, obtaining local computing data corresponding to the completed unit computing task, and determining the third quantized value according to the subgraph data, a quantity of completed unit computing tasks, the global computing data, and the local computing data.

In an embodiment, the computer program further causes the processor to perform the following steps: obtaining a first sum of current second quantized values of the subgraph data, obtaining a second sum of current third quantized values of the subgraph data, determining a contrast value of the second sum relative to the first sum, and determining that the second quantized value and the third quantized value do not meet the equilibrium condition in a case that the contrast value is outside a specified range.

In an embodiment, when the computer program causes the processor to perform a step of determining a contrast value of the second sum relative to the first sum, the following step may be performed: calculating the contrast value according to the following formula:

$$\frac{\log_a^{m+|\sum_{i=1}^n D_i^t|}}{\log_a^{m+|\sum_{i=1}^n C_i^t|}}$$

where a and m are both constants; a>0, and a≠1; m≥1; $D_i$ represents a third quantized value of the to-be-exchanged graph node; $C_i$ represents a second quantized value of the to-be-exchanged graph node; $|\sum_{i=1}^n D_i^t|$ represents a second sum; and $|\sum_{i=1}^n C_i^t|$ represents a first sum.

In an embodiment, a minimum value μ(t) and a maximum value λ(t) of the specified range are linear decreasing functions that vary with a time t, and μ(t)<λ(t).

In an embodiment, when the computer program causes the processor to perform a step of exchanging the graph node and the first quantized value with another computing node, the following steps may be performed: exchanging the first quantized value with the corresponding graph node of the another computing node in a case that the contrast value is less than the minimum value of the specified range, the contrast value after the exchange falling within the specified range, and exchanging the graph node with the first quantized value of the another computing node in a case that the contrast value is greater than the maximum value of the specified range, the contrast value after the exchange falling within the specified range.

In an embodiment, when the computer program causes the processor to perform a step of exchanging the graph node and the first quantized value with another computing node, the following steps may be performed: determining, between the computing node and the another computing node, a first computing node providing a to-be-exchanged graph node and a second computing node exchanging for the to-be-exchanged graph node, determining a first estimated quantized value of the to-be-exchanged graph node estimated by the first computing node, determining a second estimated quantized value of the to-be-exchanged graph node estimated by the second computing node, determining, according to the first estimated quantized value and the second estimated quantized value, a first quantized value used for exchanging for the to-be-exchanged graph node, and exchanging the to-be-exchanged graph node and the determined first quantized value between the computing node and the another computing node.

In an embodiment, when the computer program causes the processor to perform a step of determining a first estimated quantized value of the to-be-exchanged graph node estimated by the first computing node, the following step may be performed: calculating the first estimated quantized value according to the following formula:

$$y_1(v_i, k) = \alpha e^{-\beta \frac{D_i - \overline{D_k}}{C_i - \overline{C_k}}}$$

where $v_i$ represents a to-be-exchanged graph node, k represents a first computing node, $y1(v_i, k)$ represents a first estimated quantized value obtained by the first computing node for the to-be-exchanged graph node. $D_i$ represents a third quantized value of the to-be-exchanged graph node, $C_i$ represents a second quantized value of the to-be-exchanged graph node. $\overline{D_k}$ represents an average third quantized value of graph nodes in the first computing node k, $\overline{C_k}$ represents an average second quantized value of the graph nodes in the first computing node k, $\alpha$ and $\beta$ are system parameters, and e is a natural constant.

In an embodiment, when the computer program causes the processor to perform a step of determining a second estimated quantized value of the to-be-exchanged graph node estimated by the second computing node, the following step may be formed: calculating the second estimated quantized value according to the following formula:

$$y_2(v_i, 1) = \alpha e^{-\gamma D_i + \Sigma_{j \in 1} dist(i,j)}$$

where $v_i$ represents the to-be-exchanged graph node, 1 represents the second computing node, $y_2(v_i, 1)$ represents the second estimated quantized value of the to-be-exchanged graph node estimated by the second computing node, $D_i$ represents the third quantized value of the to-be-exchanged graph node, and $\Sigma_{j \in 1} dist(i,j)$ represents a sum of communication distances between a graph node j in the second computing node l and the to-be-exchanged graph node i.

In an embodiment, when the computer program causes the processor to perform a step of determining a communication distance between a graph node in the second computing node exchanging for the to-be-exchanged graph node and the to-be-exchanged graph node, the following step may be performed: calculating the communication distance according to the following formula:

$$dist(i, j) \stackrel{def}{=} \begin{cases} 1, & e_{i,j} \in E \\ 0, & e_{i,j} \notin E \end{cases}$$

where dist(i,j) represents a communication distance between the graph node j in the second computing node l and the to-be-exchanged graph node i, $e_{i,j} \in E$ means that the graph node j is connected to the graph node i through an edge, and $e_{i,j} \notin E$ means that there is no edge between the graph node j and the graph node i.

The computer-readable storage medium divides to-be-processed graph data into a plurality of pieces of subgraph data, and performs distributed processing on the plurality of pieces of subgraph data, thereby greatly improving graph data processing efficiency. A first quantized value, a second quantized value, and a third quantized value are obtained separately, and when the second quantized value and the third quantized value do not meet an equilibrium condition, a graph node and the first quantized value are exchanged between a computing node and another computing node. The first quantized value and the second quantized value may measure a computing capacity of the computing node, and the third quantized value may measure a load status of the computing node. In this way, the computing capacity and the load status of the computing node may be quantitatively indicated by using quantized values corresponding to a unit computing tasks, which is accurate and intuitive. The graph nodes and the first quantized values are exchanged between the computing node and the another computing node, to keep that the second quantized value and the third quantized value meet the equilibrium condition. In this way, instead of relying on a specific server or node for task allocation, computing nodes cooperate with each other to allocate graph nodes, and dynamically adjust the allocation, to implement self-organized load balancing and avoid problems of single point of failure and network congestion of the specific server, thereby greatly improving task scheduling efficiency. Moreover, such a self-organized dynamic task scheduling method can adapt to computing task scheduling of a larger-scale cluster, and a dynamic increase or decrease of a quantity of computing nodes does not affect existing computing tasks, so that high scalability is achieved.

A person of ordinary skill in the art may understand that all or some of steps of the embodiments may be implemented by hardware or a program instructing related hardware. The program may be stored in a computer-readable storage medium. The storage medium may be a read-only memory (ROM), a magnetic disk or an optical disc.

The foregoing descriptions are merely exemplary embodiments of this disclosure, but are not intended to limit this disclosure. Any modification, equivalent replacement, or improvement made without departing from the spirit and principle of this disclosure is to fall within the protection scope of this disclosure.

What is claimed is:

1. A graph data based task scheduling method, comprising:
    obtaining subgraph data divided from graph data to be processed by a computing node, the subgraph data comprising a plurality of graph nodes;
    performing, with the computing node, a plurality of unit computing tasks for a graph node in the subgraph data;
    determining a first completed unit computing task in the subgraph data, the first completed unit computing task representing a completed unit computing task through which data is obtained has been recorded in a block of a blockchain network;
    quantizing the first unit computing task to obtain a first quantized value for the computing node, the first quantized value being for indicating a resource for being exchanged in the blockchain network;

determining a second completed unit computing task in the subgraph data, the second completed unit computing task representing a completed unit computing task through which data is obtained has not been recorded in a block of the blockchain network;

quantizing the second completed unit computing task to obtain a second quantized value for the computing node, the second quantized value being for measuring a computing capacity of the computing node;

determining a third quantized value corresponding to an uncompleted unit computing task in the subgraph data, the third quantized value being for measuring a load of the computing node;

determining whether the computing code meeting an equilibrium condition based on the second quantized value and the third quantized value, the equilibrium condition being for measuring whether a current computing capacity and a current load of the computing node are balanced; and exchanging a graph node and the first quantized value with another computing node in response to the computing node failing to meet the equilibrium condition.

2. The method of claim 1, wherein the obtaining the subgraph data divided from the graph data to be processed comprises:

obtaining task information corresponding to the graph data and broadcast in a blockchain network; and reading, according to the task information, a task-executable file and the subgraph data divided from the graph data; and the performing the unit computing task for the graph node in the subgraph data comprises:

performing the task-executable file according to the subgraph data, the task-executable file indicating the unit computing task for the graph node in the subgraph data.

3. The method of claim 1, wherein determining the first completed unit computing task in the subgraph data comprises:

writing global computing data updated by a completed unit computing task into a new block, the global computing data are data shared and updated globally in a process of calculating the subgraph data in each of computing nodes; and after the new block being verified by a blockchain network, adding the new block into the blockchain network to form blockchain data, and determining the completed unit computing task as the first completed unit computing task.

4. The method of claim 3, wherein quantizing the second completed unit computing task to obtain the second quantized value comprises:

obtaining a historical second quantized value before the global computing data being written into the new block, the historical second quantized value corresponding to the second completed unit computing task; and subtracting the first quantized value from the historical second quantized value to obtain the second quantized value.

5. The method of claim 1, wherein the determining the third quantized value comprises:

obtaining latest global computing data from a blockchain network;

obtaining local computing data corresponding to the completed unit computing task; and determining the third quantized value according to the subgraph data, a quantity of completed unit computing tasks, the latest global computing data, and the local computing data.

6. The method of claim 1, wherein the method further comprises:

obtaining a first sum of second quantized values of the subgraph data;

obtaining a second sum of third quantized values of the subgraph data;

determining a contrast value of the second sum relative to the first sum; and determining that the second quantized value and the third quantized value fail to meet the equilibrium condition in response to the contrast value being outside a specified range.

7. The method of claim 6, wherein the determining the contrast value comprises:

calculating the contrast value using a formula:

$$\frac{\log_a^{m+|\sum_{i=1}^n D_i^t|}}{\log_a^{m+|\sum_{i=1}^n C_i^t|}},$$

wherein a and m are constants, $a>0$ and $a \ne 1$, $m \ge 1$, $|\sum_{i=1}^n D_i^t|$ represents a second sum; and $|\sum_{i=1}^n C_i^t|$ represents a first sum.

8. The method of claim 7, wherein a minimum value $\mu(t)$ and a maximum value $\lambda(t)$ of the specified range are both linear decreasing functions that vary with a time t, and $\mu(t)<\lambda(t)$.

9. The method of claim 6, wherein the exchanging the graph node and the first quantized value with the another computing node comprises:

exchanging the first quantized value for a graph node of the another computing node in response to the contrast value being less than a minimum value of the specified range, the contrast value after the exchange falling within the specified range; and exchanging the graph node for a first quantized value of the another computing node in response to the contrast value being greater than a maximum value of the specified range, the contrast value after the exchange falling within the specified range.

10. The method of claim 1, wherein the exchanging the graph node and the first quantized value with the another computing node comprises:

selecting a first computing node providing a to-be-exchanged graph node and a second computing node exchanging for the to-be-exchanged graph node from the computing node and the another computing node;

determining a first estimated quantized value of the to-be-exchanged graph node estimated by the first computing node;

determining a second estimated quantized value of the to-be-exchanged graph node estimated by the second computing node;

determining, according to the first estimated quantized value and the second estimated quantized value, a determined first quantized value for exchanging for the to-be-exchanged graph node; and exchanging the to-be-exchanged graph node and the determined first quantized value between the computing node and the another computing node.

11. The method of claim 10, wherein the determining the first estimated quantized value of the to-be-exchanged graph node estimated by the first computing node comprises:
calculating the first estimated quantized value using a formula:

$$y_1(v_i, k) = \alpha e^{-\beta \frac{D_i - \overline{D_k}}{C_i - \overline{C_k}}},$$

Wherein $v_i$ represents a to-be-exchanged graph node, k represents a first computing node, $y_1(v_i, k)$ represents a first estimated quantized value, $D_i$ represents a third quantized value of the to-be-exchanged graph node, $C_i$ represents a second quantized value of the to-be-exchanged graph node, $\overline{D_k}$ represents an average third quantized value of graph nodes in the first computing node k, $\overline{C_k}$ represents an average second quantized value of the graph nodes in the first computing node k, $\alpha$ and $\beta$ are system parameters, and e is a natural constant.

12. The method of claim 10, wherein the determining the second estimated quantized value of the to-be-exchanged graph node estimated by the second computing node comprises:
calculating the second estimated quantized value using a formula:

$$y_2(v_i, 1) = \alpha e^{-\gamma D_i + \Sigma_{j \in 1} dist(i,j)},$$

wherein $v_i$ represents the to-be-exchanged graph node, 1 represents the second computing node, $y_2(v_i, 1)$ represents the second estimated quantized value, $D_i$ represents a third quantized value of the to-be-exchanged graph node, and $\Sigma_{j \in 1} dist(i,j)$ represents a sum of a communication distance between a graph node j in the second computing node 1 and the to-be-exchanged graph node i.

13. The method of claim 12, further comprising:
calculating the communication distance using a formula:

$$dist(i, j) \overset{def}{=} \begin{cases} 1, & e_{i,j} \in E \\ 0, & e_{i,j} \notin E \end{cases},$$

wherein dist(i,j) represents a communication distance between the graph node j and the to-be-exchanged graph node i, $e_{i,j} \in E$ represents that the graph node j is connected to the graph node i through an edge, and $e_{i,j} \notin E$ represents that there is no edge between the graph node j and the graph node i.

14. A graph-data-based task scheduling apparatus, comprising:
a memory operable to store program code; and
a processor operable to read the program code and configured to:
obtain subgraph data divided from graph data to be processed by a computing node, the subgraph data comprising a plurality of graph nodes;
perform, with the computing node, a plurality of unit computing tasks for a graph node in the subgraph data;
determine a first completed unit computing task in the subgraph data, the first completed unit computing task representing a completed unit computing task through which data is obtained has been recorded in a block of a blockchain network;
quantize the first unit computing task to obtain a first quantized value for the computing node, the first quantized value being for indicating a resource for being exchanged in the blockchain network;
determine a second completed unit computing task in the subgraph data, the second completed unit computing task representing a completed unit computing task through which data is obtained has not been recorded in a block of the blockchain network;
quantize the second completed unit computing task to obtain a second quantized value for the computing node, the second quantized value being for measuring a computing capacity of the computing node;
determine a third quantized value corresponding to an uncompleted unit computing task in the subgraph data, the third quantized value being for measuring a load of the computing node; and
determine whether the computing code meeting an equilibrium condition based on the second quantized value and the third quantized value, the equilibrium condition being for measuring whether a current computing capacity and a current load of the computing node are balanced;
exchange the graph node and the first quantized value with another computing node in response to the second quantized value and the third quantized value failing to meet an equilibrium condition.

15. The apparatus of claim 14, wherein the processor is configured to:
obtain task information corresponding to the graph data and broadcast in a blockchain network;
read, according to the task information, a task-executable file and the subgraph data divided from the graph data; and
perform the task-executable file according to the subgraph data, the task-executable file indicating the unit computing task for the graph node in the subgraph data.

16. The apparatus of claim 14, wherein the processor is configured to:
write global computing data updated by a completed unit computing task into a new block, the global computing data are data shared and updated globally in a process of calculating the subgraph data in each of computing nodes; and
after the new block being verified by a blockchain network,
add the new block into the blockchain network to form blockchain data, and
determine the completed unit computing task as the first completed unit computing task.

17. The apparatus of claim 16, wherein the processor is configured to:
obtain a historical second quantized value before the global computing data being written into the new block, the historical second quantized value corresponding to the second completed unit computing task; and
subtract the first quantized value from the historical second quantized value, to obtain the second quantized value.

18. The apparatus of claim 14, wherein the processor is configured to:

obtain latest global computing data from a blockchain network;

obtain local computing data corresponding to the completed unit computing task; and determine the third quantized value according to the subgraph data, a quantity of completed unit computing tasks, the latest global computing data, and the local computing data.

19. The apparatus of claim 14, wherein the processor is configured to:

obtain a first sum of current second quantized values of the subgraph data;

obtain a second sum of current third quantized values of the subgraph data;

determine a contrast value of the second sum relative to the first sum; and determine that the second quantized value and the third quantized value fail to meet the equilibrium condition in response to the contrast value being outside a specified range.

20. A non-transitory machine-readable media, having processor executable instructions stored thereon for causing a processor to:

obtain subgraph data divided from graph data to be processed by a computing node, the subgraph data comprising a plurality of graph nodes;

perform, with the computing node, a plurality of unit computing tasks for a graph node in the subgraph data;

determine a first completed unit computing task in the subgraph data, the first completed unit computing task representing a completed unit computing task through which data is obtained has been recorded in a block of a blockchain network;

quantize the first unit computing task to obtain a first quantized value for the computing node, the first quantized value being for indicating a resource for being exchanged in the blockchain network;

determine a second completed unit computing task in the subgraph data, the second completed unit computing task representing a completed unit computing task through which data is obtained has not been recorded in a block of the blockchain network;

quantize the second completed unit computing task to obtain a second quantized value for the computing node, the second quantized value being for measuring a computing capacity of the computing node;

determine a third quantized value corresponding to an uncompleted unit computing task in the subgraph data, the third quantized value being for measuring a load of the computing node; and determine whether the computing code meeting an equilibrium condition based on the second quantized value and the third quantized value, the equilibrium condition being for measuring whether a current computing capacity and a current load of the computing node are balanced;

exchange the graph node and the first quantized value with another computing node in response to the second quantized value and the third quantized value failing to meet an equilibrium condition.

\* \* \* \* \*